(12) United States Patent
Hodsdon et al.

(10) Patent No.: US 10,731,094 B1
(45) Date of Patent: Aug. 4, 2020

(54) COMBUSTIBLE LOG TORCH

(71) Applicants: David W. Hodsdon, St. Marys, PA (US); Michael L. Wahl, St. Marys, PA (US); Phillip P. McDonald, Port Matilda, PA (US)

(72) Inventors: David W. Hodsdon, St. Marys, PA (US); Michael L. Wahl, St. Marys, PA (US); Phillip P. McDonald, Port Matilda, PA (US)

(73) Assignee: CAMPFIRE INNOVATIONS, LLC, St. Marys, PA (US)

( * ) Notice: Subject to any disclaimer, the term of this patent is extended or adjusted under 35 U.S.C. 154(b) by 105 days.

(21) Appl. No.: 15/657,370

(22) Filed: Jul. 24, 2017

Related U.S. Application Data

(60) Provisional application No. 62/365,432, filed on Jul. 22, 2016, provisional application No. 62/381,816, filed on Aug. 31, 2016.

(51) Int. Cl.
*C10L 5/36* (2006.01)
*C10L 5/14* (2006.01)
*C10L 5/44* (2006.01)

(52) U.S. Cl.
CPC .............. *C10L 5/365* (2013.01); *C10L 5/14* (2013.01); *C10L 5/36* (2013.01); *C10L 5/442* (2013.01); *C10L 2290/30* (2013.01); *C10L 2290/32* (2013.01)

(58) Field of Classification Search
CPC .. C10L 5/14; C10L 5/361; C10L 5/363; C10L 5/365; C10L 2290/30; C10L 2290/32
See application file for complete search history.

(56) References Cited

U.S. PATENT DOCUMENTS

| | | | | |
|---|---|---|---|---|
| 4,326,854 | A * | 4/1982 | Tanner | C10L 5/105 44/567 |
| 5,496,384 | A * | 3/1996 | Jeskey | C10L 5/44 44/532 |
| 5,833,353 | A | 11/1998 | Smith | |
| 8,597,381 | B2 | 12/2013 | Paapsi | |
| 2006/0230673 | A1* | 10/2006 | Barford | C10L 5/365 44/535 |
| 2008/0206541 | A1* | 8/2008 | Medoff | B29B 7/92 428/292.1 |

(Continued)

*Primary Examiner* — Ellen M McAvoy
*Assistant Examiner* — Ming Cheung Po
(74) *Attorney, Agent, or Firm* — Alvin Rockhill

(57) ABSTRACT

A combustible log torch which can be ignited to provide heat for warmth or cooking, and light for illumination can be made by compacting a mixture of wood sawdust and a food grade binder. Such combustible log torches are convenient and safe to use and provide optimal characteristics of quickly providing a bonfire without the need for a fireplace or a fire pit. The fire produced by such combustible logs is also optimal for safely and conveniently cooking food items. Such a combustible log torch can be manufactured by a method which comprises compacting a composition which is comprised of a mixture of wood particles and a food grade binder under a pressure of at least about 5 psi (0.034 megapascals) in a mold to produce the combustible log torch having at least one vertical cavity (hole) which extend vertically through the entire length of the combustible log torch.

14 Claims, 19 Drawing Sheets

(56) References Cited

U.S. PATENT DOCUMENTS

2011/0126452 A1* 6/2011 Blackmore ............... C10L 5/36
　　　　　　　　　　　　　　　　　　　　　　　44/522
2011/0287159 A1* 11/2011 Hassan .................. C11B 13/00
　　　　　　　　　　　　　　　　　　　　　　　426/602
2012/0279116 A1　11/2012 Lavole

* cited by examiner

COMBUSTIBLE LOG TORCH

This application claims benefit of U.S. Provisional Patent Application Ser. No. 62/365,432, filed on Jul. 22, 2016, and also claims the benefit of U.S. Provisional Patent Application Ser. No. 62/381,816, filed on Aug. 31, 2016. The teachings of U.S. Provisional Patent Application Ser. No. 62/365,432 and U.S. Provisional Patent Application Ser. No. 62/381,816 are incorporated herein by reference in their entirety.

FIELD OF THE INVENTION

The subject invention relates to a novel type of combustible log torch which can be ignited to provide heat for warmth or cooking, and light for illumination. It is convenient and safe to use and provides optimal characteristics of quickly providing a bonfire without the need for a fireplace or a fire pit. The fire produced by the combustible log of this invention is also optimal for safely and conveniently cooking food items thereon.

BACKGROUND OF THE INVENTION

Throughout history, open fires have been used to generate heat for a warmer, more comfortable environment, for cooking, and as a source of light for illumination. Fires are also deemed to be aesthetically pleasing, and are frequently made at parties, celebrations, and other social gatherings even though they are not needed for heat, light or cooking. On the other hand, open fires are commonly used in the typical way during camping trips to provide warmth and light as well as a heat source for cooking.

Over the centuries there have been many innovations which made the use of fire safer, more efficient for a particular purpose, and more convenient. The Swedish fire torch is said to have been developed for use by Swedish soldiers during the thirty year war between 1618 and 1648. Through a specially developed sawing process the Swedish soldiers were said to use fresh pinewood as a source of heat and did not need to travel great distances for firewood at camp. The Swedish torch is burnt vertically and burns evenly over a relatively long period of time.

Today, the Swedish torch, also known as a Canadian Candle, is popular because it is a convenient way to start a fire with only one log, provides a flat cooking surface and is self-feeding (it can burn for several hours without any attention). The Swedish torch is easy to build, takes up a small amount of space and is also a good fire to make in snow, as the main part of the construction is kept off the wet ground. The Swedish torch is made by splitting a log into four quarters. The log is then reassembled, leaving equally sized gaps between each of the four pieces. The kindling for the fire is made of smaller pieces of wood which are placed at alternating angles, in a crisscross fashion, in the gaps between the four pieces of the log. The tinder which is used to start the fire is typically placed at the top of the torch and is generally also placed intermittently between the kindling. The burning kindling will drop down into the lower layers of the Swedish torch causing it to ignite all four quarters of the split. Air is able to circulate within the burning log by virtue of the gaps between the split log which, of course, provides oxygen to the burning fire. It is easy to set such a Swedish torch on fire and it will burn freely requiring virtually no additional attention for up to several hours.

In more recent times, numerous devices have been developed which allow people to enjoy open fires for heat, cooking, and simply for the aesthetically pleasing atmosphere which they create. For example, sophisticated charcoal grills have been developed for cooking food over burning wood or charcoal. Various types of liquid hydrocarbon burning torches have been developed for illumination and to provide the desired atmosphere. Logs which are designed for easy lighting and which require little attention and work, such as Duraflame® logs, have also become popular in recent times. Such manufactured logs are typically made with blends of sawdust or agricultural biomass with natural waxes and oils derived from organic materials.

U.S. Pat. No. 8,597,381 describes a fire log which has one or several longitudinal incisions, which penetrate the log but do not reach the side surface and intersect in the log's midsection. A lower part of this log has at least one air duct from the side surface to the log's midsection in case the log is set on a surface which obstructs airflow to the log's lower part. The log's midsection contains an ignition device, which can be an ignition strip, tablet, briquette or other that has been permeated with an ecologically friendly flammable substance that burns fast and evenly.

U.S. Pat. No. 5,833,353 discloses a combustible device which can be ignited to furnish warmth for comfort, heat for cooking, and light for illumination, and which may also be aesthetically pleasing. This device includes a shell formed of combustible material, which defines an updraft chamber, an intake chamber located at the lower portion of the updraft chamber and being in fluid communication with both the updraft chamber and the outside of the shell, and one or more exhaust flues located at the top of the updraft chamber. The flues also are in fluid communication with both the updraft chamber and the outside of the shell, to provide an exit for smoke and ashes formed by combustion in the updraft chamber. The updraft chamber of this device may be tapered, so that the upper portion of the updraft chamber is narrower than the lower portion of the updraft chamber. Preferably, the combustible shell is formed with an aesthetically pleasing appearance, such as a relief shaped like a face. The shell may also include a thick, solid spine along its length, to maintain the balance of the shell while it burns.

SUMMARY OF THE INVENTION

The subject invention relates to a novel type of combustible log torch which can be ignited to provide heat for warmth or cooking, and light for illumination. It is convenient and safe to use and provides optimal characteristics of quickly providing an aesthetically pleasing bonfire without the need for a fireplace or a fire pit. The fire produced by the combustible log of this invention is also optimal for safely and conveniently cooking food items thereon because the flames produced project in a generally upwardly fashion to provide a concentrated area of flames above the log. It is also important to appreciate that the combustible log torches of this invention do not emit any substances which cause safety concerns, environmental concerns, or which cause food items being cooked to have a foul flavor or taste. In fact, food items cooked over open flames of the combustible logs of this invention are typically imparted with a very pleasant wood-fired flavor.

The combustible log torch of this invention can also be easily transported to a desired location, such as a campsite, and can be easily ignited and will burn in a self-contained fashion for an extended period of time without further attention. The combustible log torch of this invention is designed for being burnt on the ground without the need for a fireplace or a fire-pit. However, it can be burnt in a fireplace or a fire-pit if so desired. In fact, the combustible log torches of this invention can conveniently be used as starter logs in building conventional fires in fireplaces and fire-pits.

The combustible log torches of this invention are made with wood particles, such as wood sawdust, wood shavings, wood dust, wood chips, and mixtures thereof. The combustible log torches of this invention can optionally include lignin. In any case, renewable materials which are byproducts from sawmills and paper plants are utilized in manufacturing the combustible log torches of this invention. There is a long felt need for value added uses for wood particles and lignin which is provided by their use in the combustible log torches of this invention. The combustible log torches of this invention are also made by an efficient process that does not typically require any cutting or machining. In other words, the combustible log torches of this invention can be manufactured consistently in an efficient manner without the need for labor intensive procedures.

The present invention more specifically discloses a method for manufacturing a combustible log torch which comprises compacting a wood particle composition which is comprised of a mixture of wood particles and a food grade binder under a pressure of at least about 5 psi (0.034 megapascals) in an essentially cylindrical mold to produce the combustible log torch having at least one vertical cavity which extend vertically through the entire length of the combustible log torch.

The subject invention further reveals a combustible log torch having a top end, a bottom end, a circumferential peripheral side, at least one vertical hole which extend through the entire length of the combustible log torch from the bottom end to the top end, and at least one vent which extend through the circumferential peripheral side of the torch longitudinally from the vertical cavity; said top end, said bottom end, and said circumferential peripheral side defining an essentially cylindrical log shaped structure which constitutes the peripheral surfaces of the combustible log torch; said combustible log torch being comprised of a combustible mixture of compressed wood particles and a food grade binder.

This invention further discloses a method for improving the burn characteristics of a manufactured wood log which comprised treating the wood log with a triglyceride oil in a manner which allows for the triglyceride oil to be absorbed into the log in an amount which is with the range of 1 weight percent to 15 weight percent, based upon the weight of the manufactured wood log. The manufactured log can be a Swedish torch, a Canadian Candle, or any other type of manufactured wood log which is made by cutting, drilling, or otherwise machining a natural wood log. In many cases it is preferred for 3 weight percent to 7 weight percent of the triglyceride oil to be absorbed into the manufactured log. This can be accomplished by a wide variety of techniques, including spraying, brushing, dipping, soaking, or emersion. In many cases it is convenient to simply dip the manufactured log into the desired oil and to allow the oil to penetrate the wood structure via the wicking effect.

DETAILED DESCRIPTION OF THE INVENTION

Figure 1:
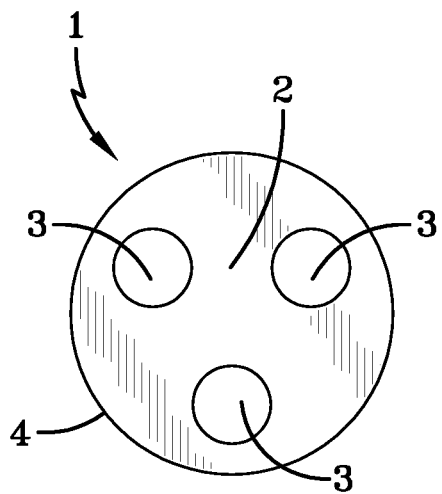
FIG. 1 is a top view of the combustible log torch of this invention.
Figure 2:
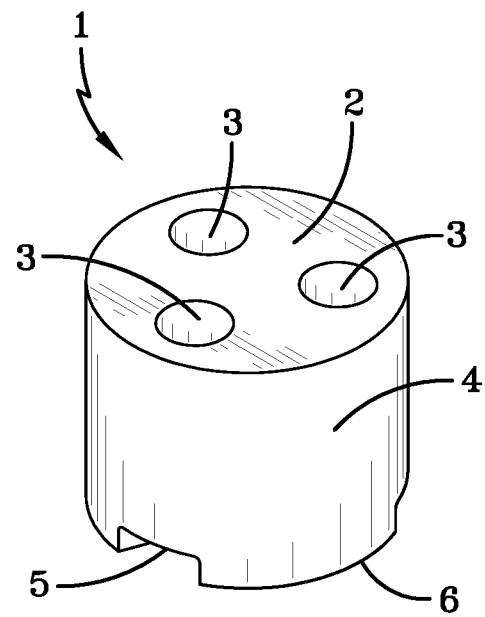
FIG. 2 is a perspective top view of the combustible log torch of this invention.
Figure 3:
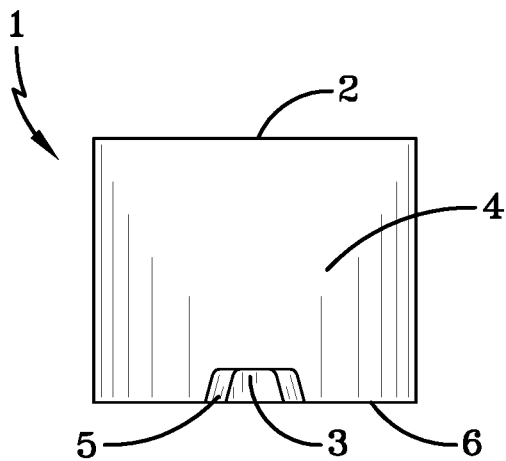
FIG. 3 is a side view of the combustible log torch of this invention.
Figure 4:
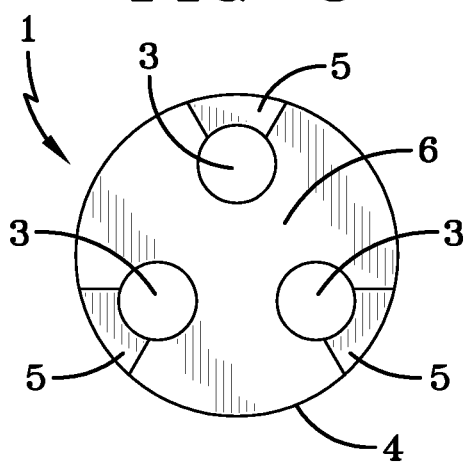
FIG. 4 is a bottom view of the combustible log torch of this invention.
Figure 5:
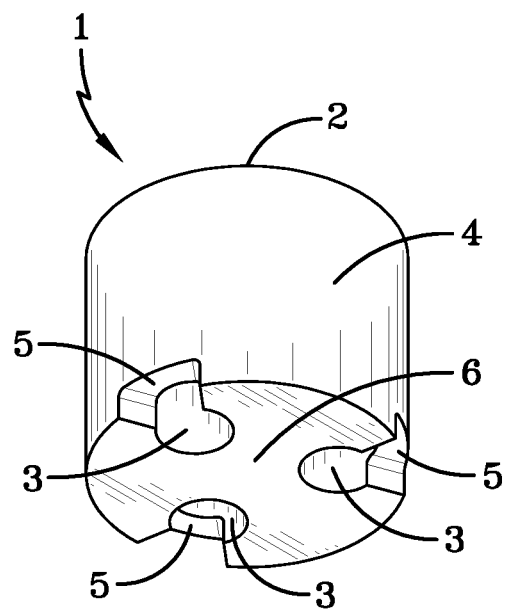
FIG. 5 is a perspective bottom view of the combustible log torch of this invention.

In the embodiment of the invention as shown in FIG. 1 and FIG. 2, the combustible log torch 1 has a top end 2 with 3 cavities (updraft chambers) 3 which extend the entire length of the combustible log torch 1 from top to bottom. As shown in FIG. 2 the combustible log torch 1 of this invention also has a circumferential peripheral side 4. As shown in FIG. 3, FIG. 4, and FIG. 5 the combustible log torch 1 also has vents 5 on its bottom end 6 which extend through the circumferential peripheral side 4 of the torch 1 longitudinally from each of the vertical cavities 3. The combustible log torch 1 can also optionally have vents which are situated on the top end 2 thereof (not shown in the drawings). To attain more consistent and uniform burning of the combustible log torch 1 it is preferred for the vents to be angled upwardly from the circumferential peripheral side of the combustible log torch to each of the vertical cavities. In such cases the vents are typically angled upwardly at an angle which is within the range of 5° to 70°. It is typically preferred for the vents to be angled upwardly at an angle which is within the range of 10° to 40° with good results being attained in cases where the vents are angled upwardly at an angel which is within the range of 20° to 30°.

Figure 6:
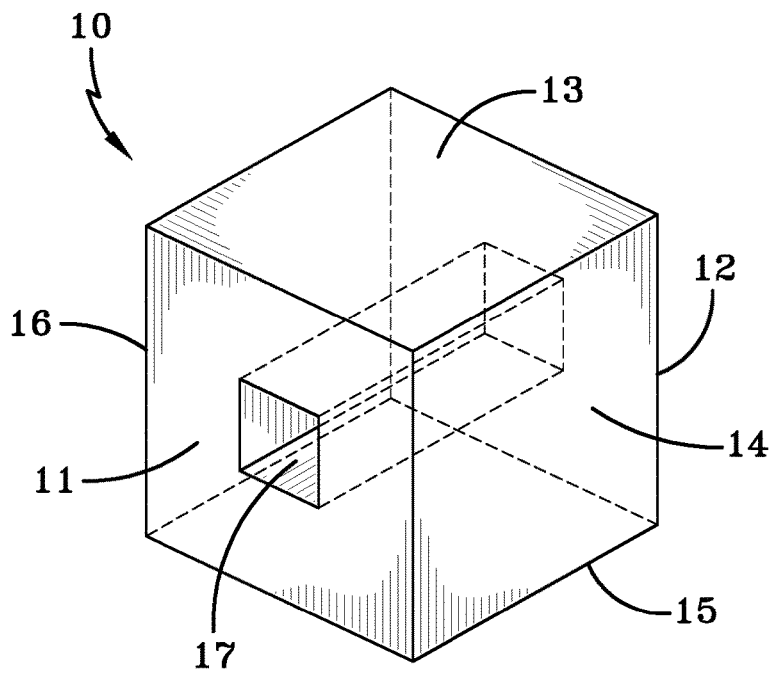
FIG. 6 is a perspective view of a combustible log torch of this invention wherein the log torch is square shaped.
Figure 7:
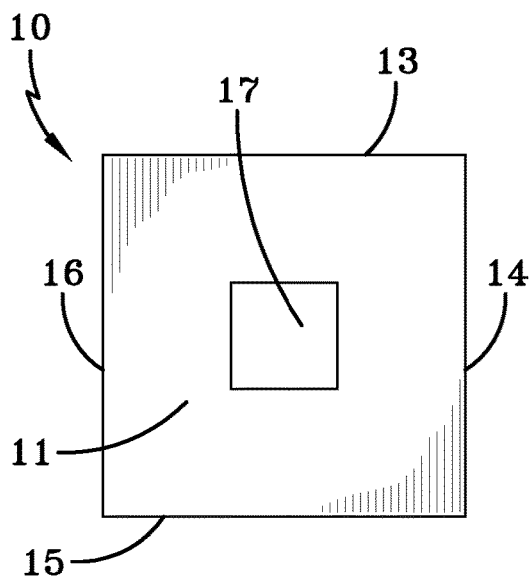
FIG. 7 is a top view of the square shaped log torch depicted in FIG. 6.
Figure 8:
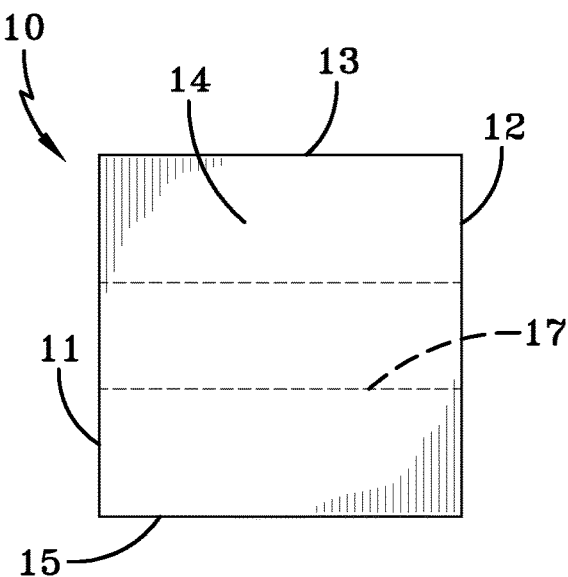
FIG. 8 is a side view of the square shaped log torch depicted in FIG. 6.

The combustible log torches of this invention will typically be of a cylindrical shape or a shape which is essentially cylindrical and which simulates natural wood logs. However, the combustible log torches of this invention can optionally be of other shapes if desired for other aesthetic effects or for particular purposes, for instance the log torches of this invention can be oval shaped, pumpkin shaped, or in the configuration of a polygon having virtually any number of sides of the same or different lengths. For example, the log torch can a square, pentagon, hexagon, heptagon, or octagon shaped profile. A log torch having a square profile is depicted in FIGS. 6-8. In this embodiment of the invention the log torch 10 has a top end 11, a bottom end 12, four flat sides 13, 14, 15, and 16, and only one vertical cavity 17 which extends vertically through the entire length of the combustible log torch. In this embodiment of the invention the vertical cavity 17 is of a square shape.

Figure 9:
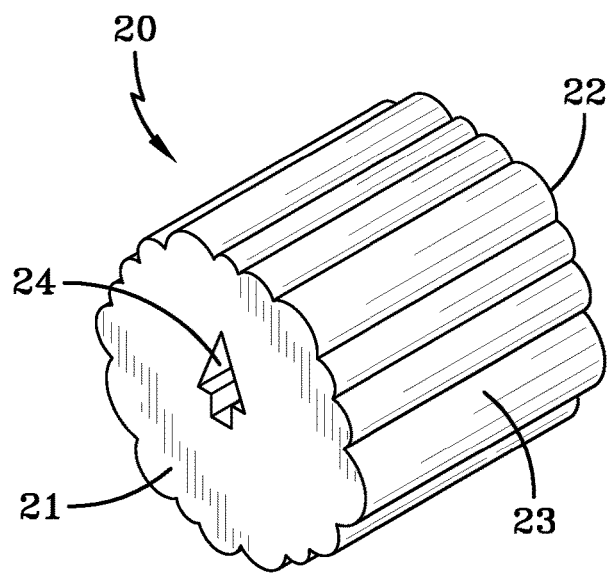
FIG. 9 is a perspective view of a combustible log torch of this invention wherein the log torch has a pumpkin shaped side and a vertical cavity having the shape of a tree.
Figure 10:
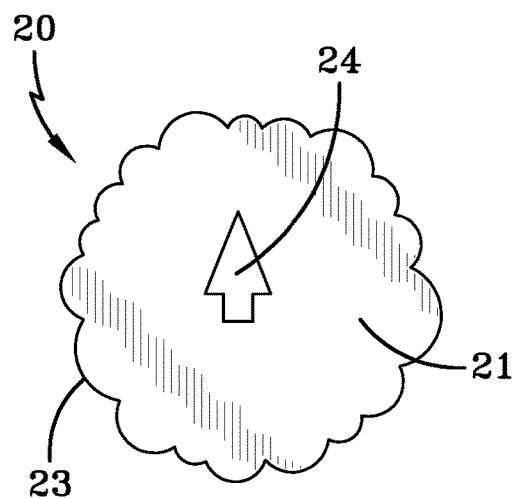
FIG. 10 is a top view of the pumpkin shaped log torch depicted in FIG. 9.
Figure 11:
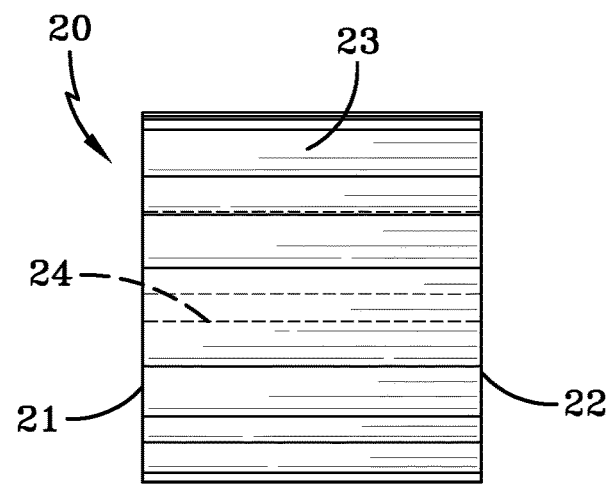
FIG. 11 is a side view of the pumpkin shaped log torch depicted in FIG. 9.
Figure 12:
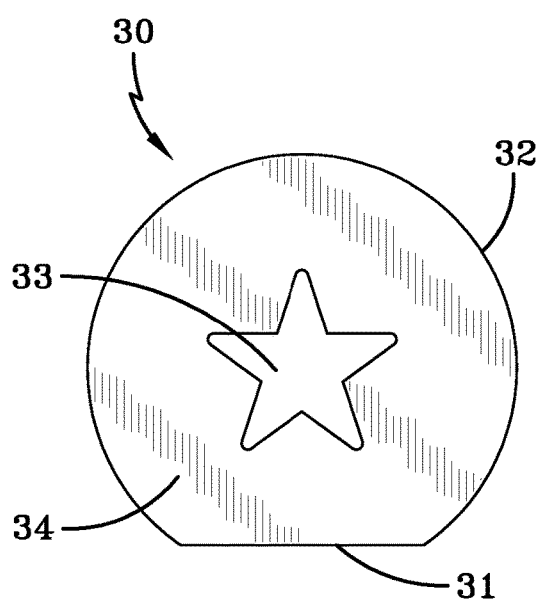
FIG. 12 is a top view of a combustible log torch of this invention wherein the log torch has an irregular side which includes a straight side portion and an essentially circular round portion. The vertical cavity in this embodiment of the invention is in the shape of a 5-pointed star.
Figure 13:
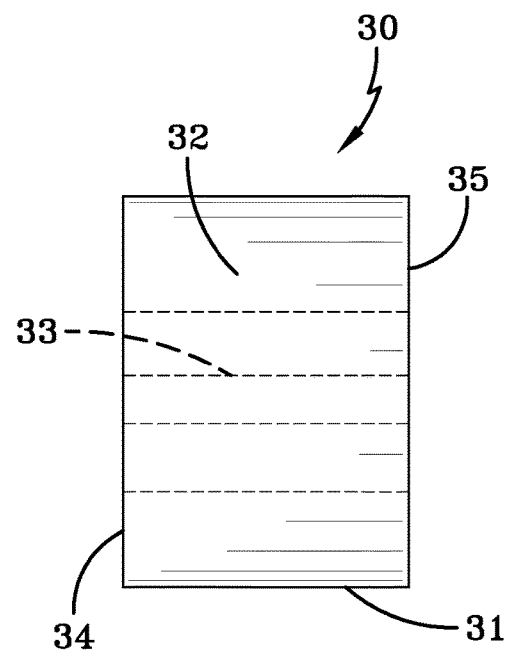
FIG. 13 is a side view of the log torch depicted in FIG. 12.
Figure 14:
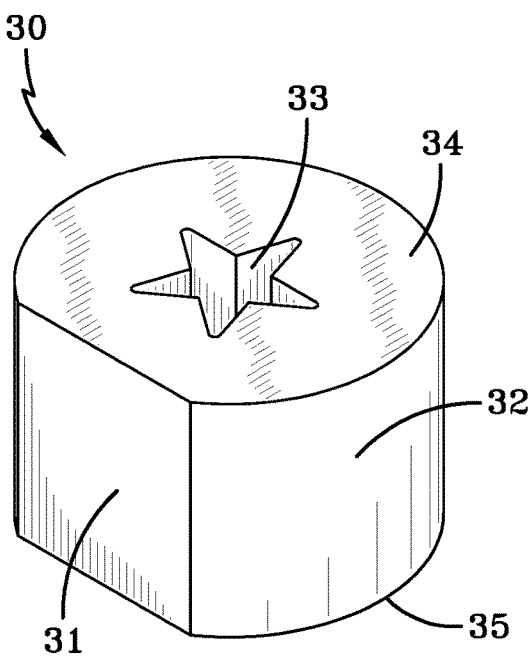
FIG. 14 is a side perspective view of the log torch depicted in FIG. 12.
Figure 15:
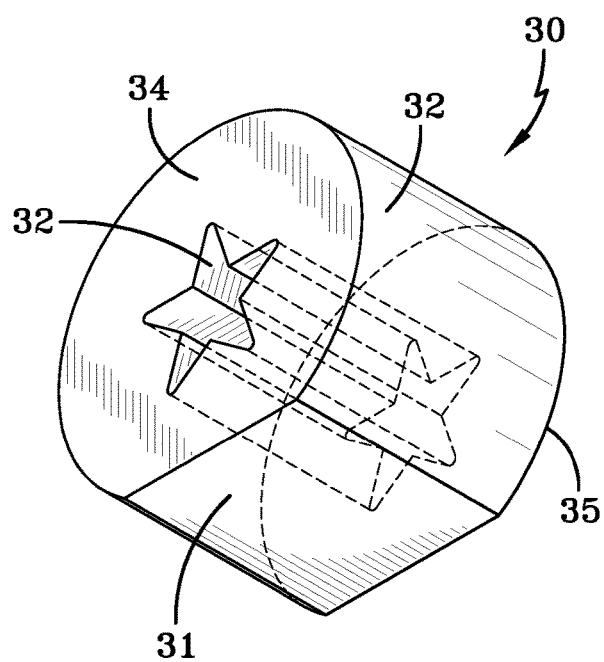
FIG. 15 is another side perspective view of the log torch depicted in FIG. 12 which illustrates the star shaped vertical cavity extending from the top end to the bottom end of the combustible log torch.
Figure 16:
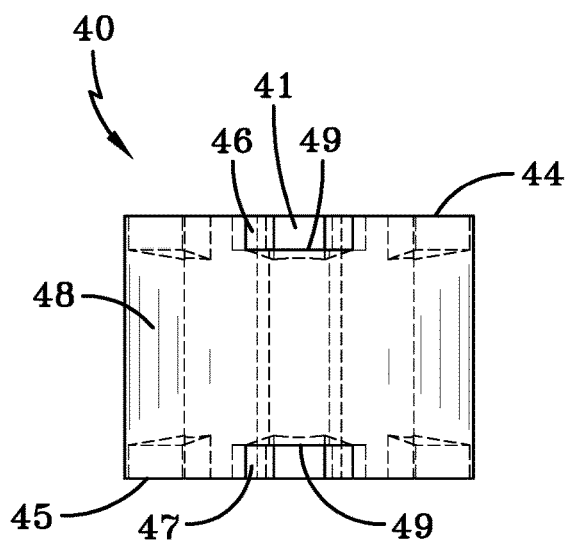
FIG. 16 is a side view of an embodiment of the combustible log torch of this invention which includes a cross-vent which interconnects the three vertical cavities.
Figure 17:
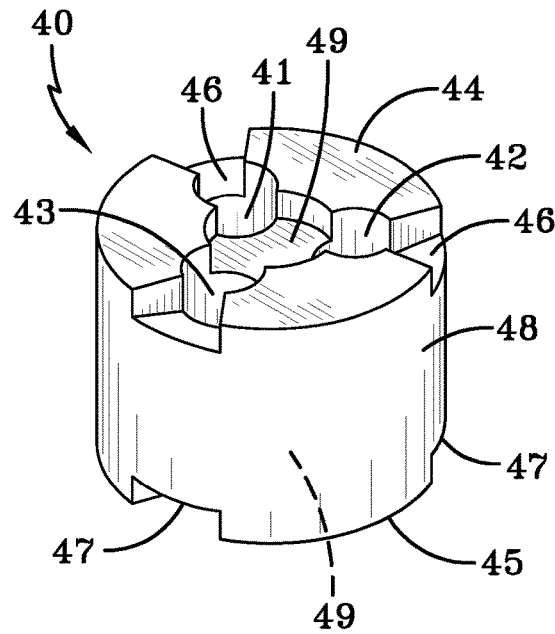
FIG. 17 is an illustration of the log torch shown in FIG. 16 which shows the three vertical cavities and the cross-vent extending through the log torch from its top end through its bottom end.
Figure 18:
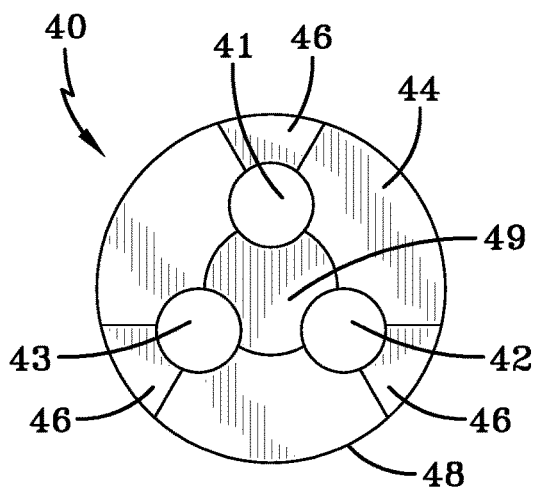
FIG. 18 is a top view of the log torch of FIG. 16 which shows the cross-vent, the three vertical cavities, and vents at the top end of the log torch which extend from each of the three vertical cavities and through the side of the log torch.
Figure 19:
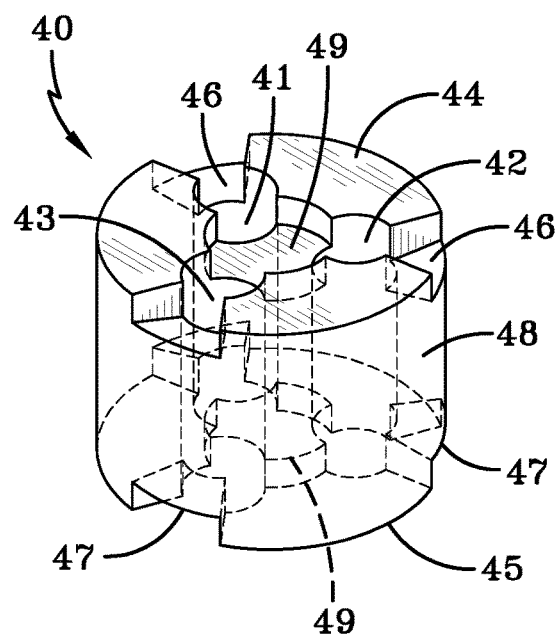
FIG. 19 is a top perspective view of the embodiment of the combustible log torch illustrated in FIGS. 16-18.

FIGS. 9-11 illustrate the embodiment of this invention wherein the combustible log torch has a pumpkin shaped profile. In this embodiment of the invention the log torch 20 has a top end 21, a bottom end 22, a continuous pumpkin shaped side 23, and a vertical cavity 24 in the shape of a tree. FIGS. 12-15 illustrate another embodiment of this invention wherein the combustible log torch 30 has an irregular side which includes a straight side portion 31 and an essentially circular round portion 32. The vertical cavity 33 in this embodiment of the invention is in the shape of a 5 pointed star which extends from the top end 34 of the log torch 30 and through the bottom end 35 of the log torch 30.

As previously explained the combustible log torches of this invention has at least one vertical cavity which extends vertically through the entire length of the combustible log torch. It will typically have at least three vertical cavities 3 which extend vertically through the entire length of the combustible log torch (from the top to the bottom of the log torches). For instance, the log torch can include 4, 5, 6, 7, 8, or more vertical cavities. These cavities act as updraft chambers and are typically round in which case they are in the form of cylinders which extend through the log torch. In most cases, it is preferred for these cavities to be round or essentially round. In most cases the round cavities will have a diameter which is from about 15% to about 40% and preferably about 20% to about 30% of the diameter of the combustible log torch. For instance, such round cavities can have a diameter of about 2.375 inches in the case where the combustible log is of a diameter of about 10.25 inches. However, the cavities can be of other desired shapes, such as ovals, squares, pentagons, hexagons, heptagons, octagons, and the like. In any case the cavities will normally be arranged on the top end and the bottom end of the torch log in a circular pattern with the cavities being centered about 40% to about 65% of the distance from the center of the log to its circumferential peripheral side. In most cases the cavities will be centered about 45% to about 60% of the distance from the center of the log to its circumferential peripheral side.

The vertical cavities can optionally include an igniter to facilitate catching the combustible log torch of this invention on fire. The igniter can be any material that will readily ignite and catch the log torch on fire. For instance, the igniter can be a wick, a fuse or any other suitable material which can optionally be impregnated with a natural flammable substance, such as a paraffin, a wax, or the like. In one preferred embodiment of this invention the igniter is simply a piece of cotton which is pushed firmly into one or more of the vertical cavities of the torch log of this invention.

Figure 25:
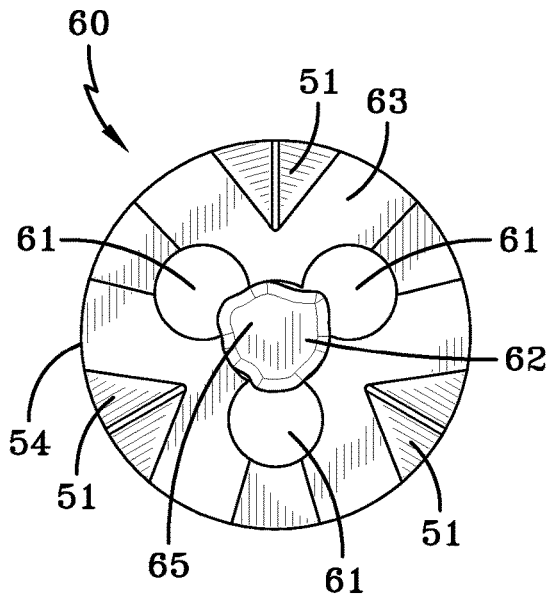
FIG. 25 is a top view of a log torch of this invention having three vertical cavities and a cross-vent extending through the log torch from its top end through its bottom end, wherein the cross-vent includes a cotton igniter to facilitate catching the log torch on fire.
Figure 26:
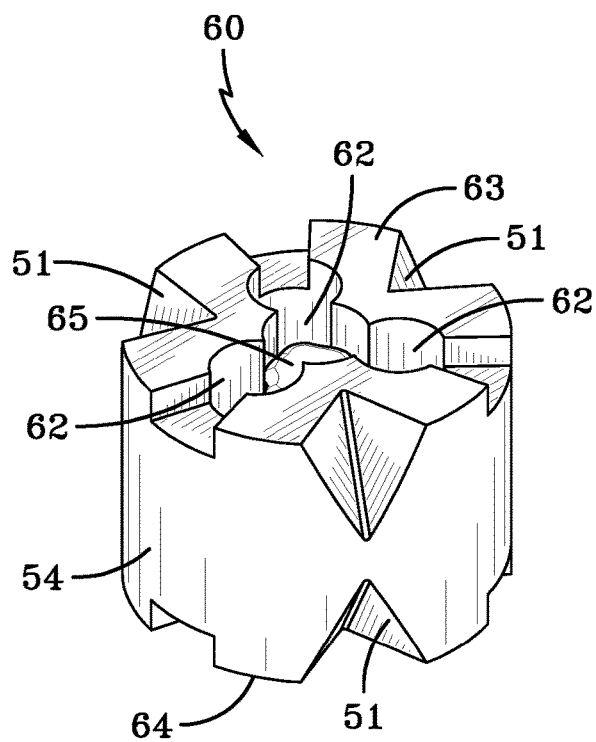
FIG. 26 is a top perspective view of the log torch illustrated in FIG. 25 having three vertical cavities and a cross-vent extending through the log torch from its top end through its bottom end, wherein the cross-vent includes a cotton igniter to facilitate catching the log torch on fire.
Figure 27:
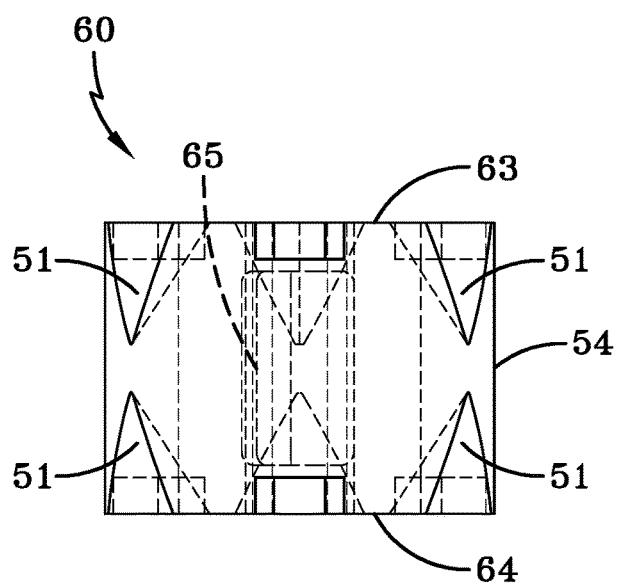
FIG. 27 is an illustration of the log torch shown in FIGS. 25 and 26 which shows the three vertical cavities and the cross-vent extending through the log torch from its top end through its bottom end, wherein the cross-vent includes a cotton igniter to facilitate catching the log torch on fire.
Figure 28:
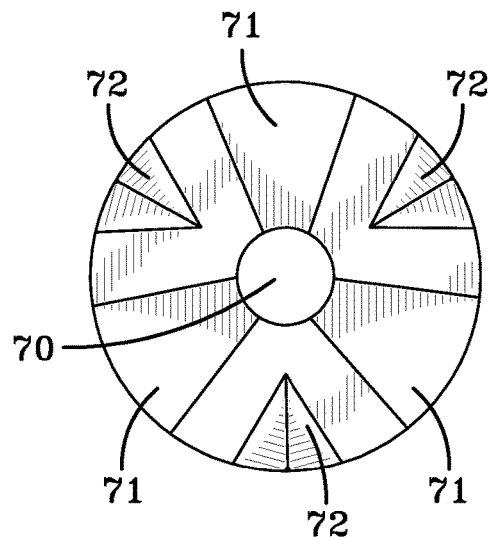
FIG. 28 is a top view of a log torch of this invention having one vertical cavity which extends completely through the log torch from its top end through its bottom end, and which further includes 3 vents and 3 notches.
Figure 29:
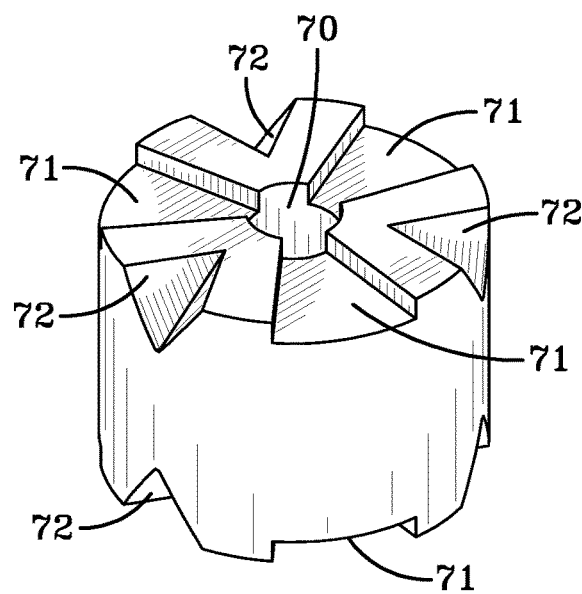
FIG. 29 is a top perspective view of the log torch illustrated in FIG. 28 having one vertical cavity which extends completely through the log torch from its top end through its bottom end, and which further includes 3 vents and 3 notches.
Figure 30:
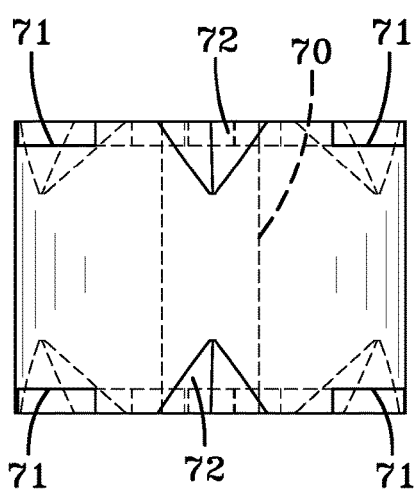
FIG. 30 is an illustrative side view of the log torch shown in FIGS. 28 and 29 showing the vertical cavity which extends completely through the log torch from its top end through its bottom end, and which further includes 3 vents and 3 notches.
Figure 31:
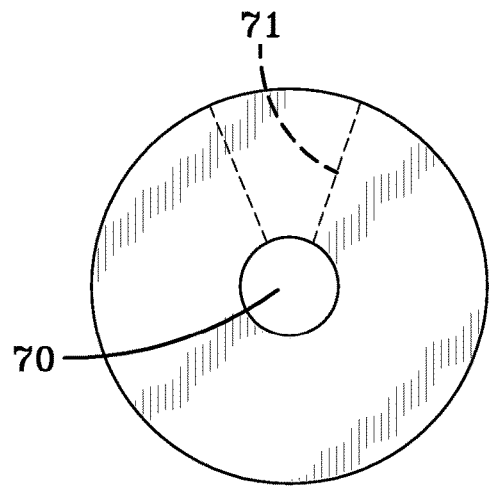
FIG. 31 is a top view of a log torch of this invention having one vertical cavity which extends completely through the log torch from its top end through its bottom end and a single vent at the bottom of the log torch.
Figure 32:
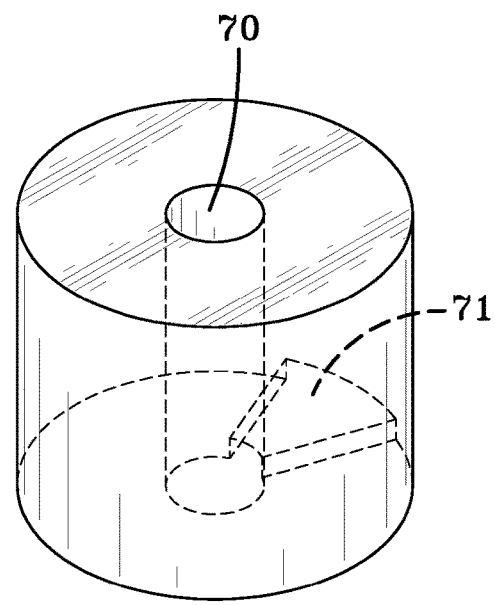
FIG. 32 is a top perspective view of the log torch illustrated in FIG. 31 having one vertical cavity which extends completely through the log torch from its top end through its bottom end and a single vent at the bottom of the torch.
Figure 33:
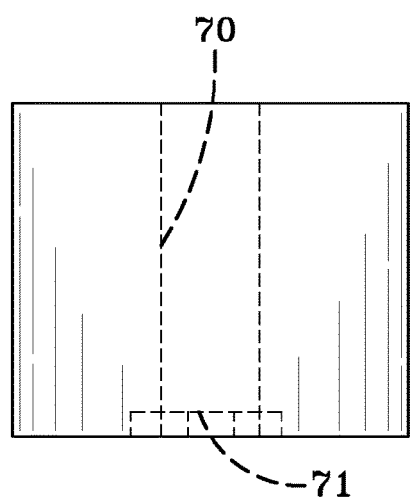
FIG. 33 is an illustrative side view of the log torch shown in FIGS. 31 and 32 showing the vertical cavity which extends completely through the log torch from its top end through its bottom end and a single vent at the bottom of the log torch.
Figure 34:
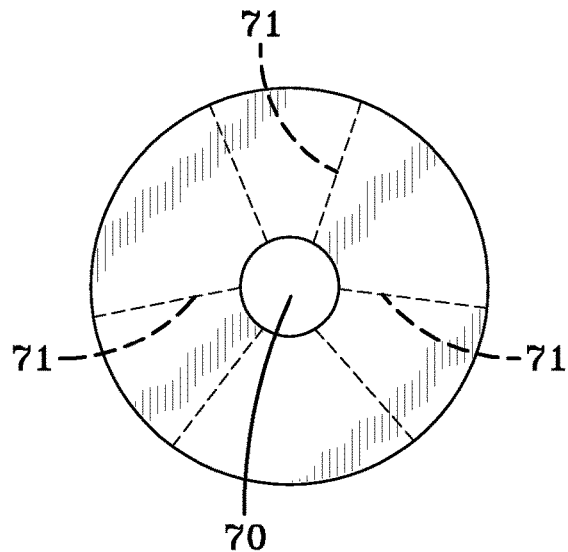
FIG. 34 is a top view of a log torch of this invention having one vertical cavity which extends completely through the log torch from its top end through its bottom end and 3 vents at the bottom of the log torch.
Figure 35:
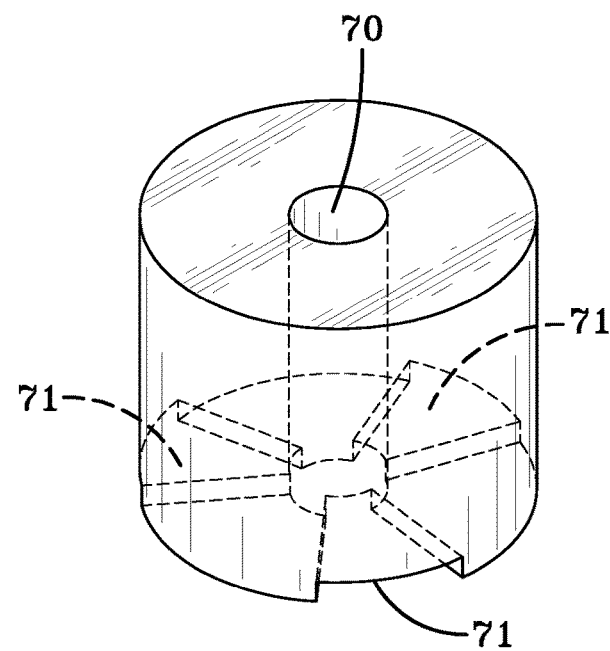
FIG. 35 is a top perspective view of the log torch illustrated in FIG. 34 having one vertical cavity which extends completely through the log torch from its top end through its bottom end and 3 vents at the bottom of the torch.
Figure 36:
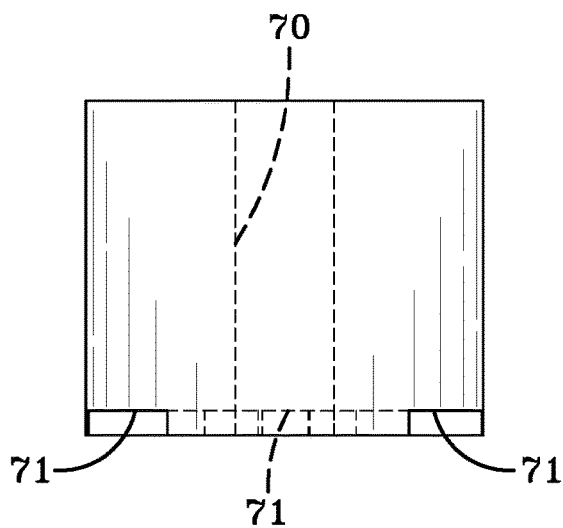
FIG. 36 is an illustrative side view of the log torch shown in FIGS. 34 and 35 showing the vertical cavity which extends completely through the log torch from its top end through its bottom end and the 3 vents at the bottom of the log torch.
Figure 37:
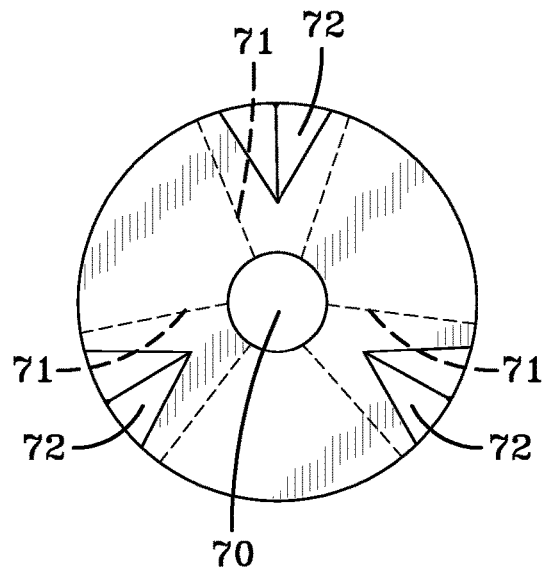
FIG. 37 is a top view of a log torch of this invention having one vertical cavity which extends completely through the log torch from its top end through its bottom end, 3 vents at the bottom of the log torch, and 3 notches at the top of the log torch.
Figure 38:
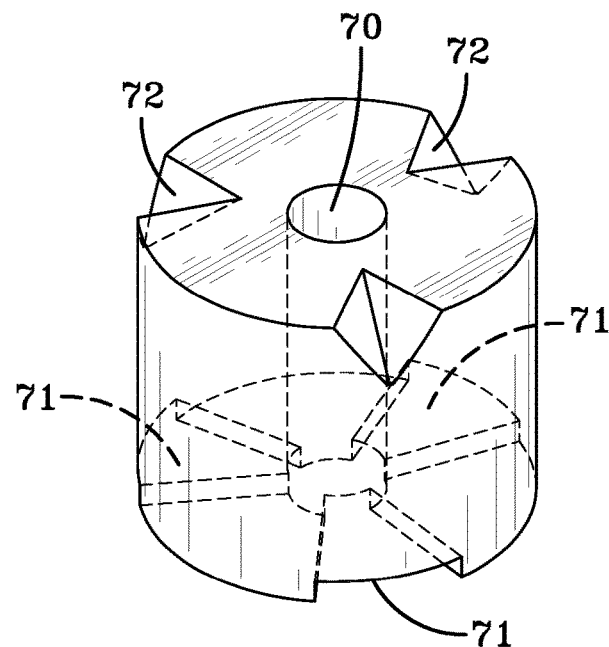
FIG. 38 is a top perspective view of the log torch illustrated in FIG. 37 having one vertical cavity which extends completely through the log torch from its top end through its bottom end, 3 vents at the bottom of the torch, and 3 notches at the top of the torch.
Figure 39:
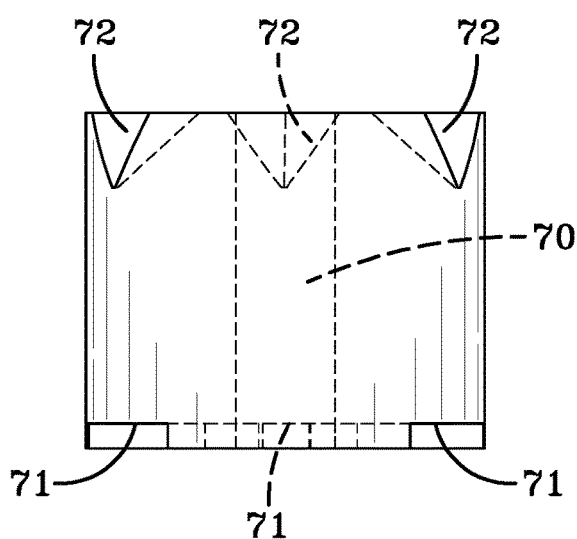
FIG. 39 is an illustrative side view of the log torch shown in FIGS. 37 and 38 showing the vertical cavity which extends completely through the log torch from its top end through its bottom end, the 3 vents at the bottom of the log torch, and the 3 notches at the top of the torch.
Figure 40:
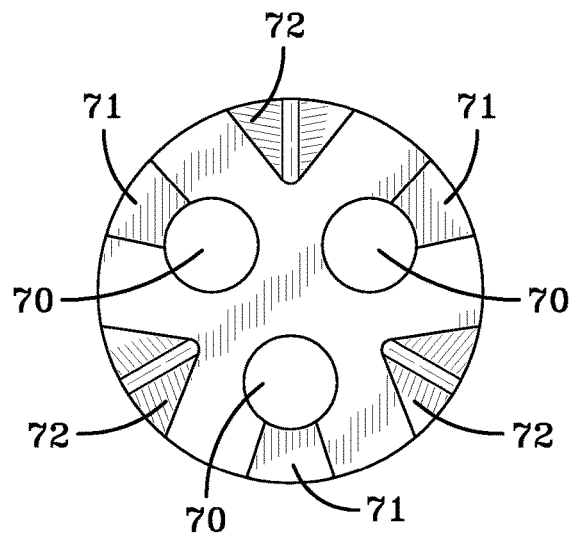
FIG. 40 is a top view of a log torch of this invention having one vertical cavity which extends completely through the log torch from its top end through its bottom end, 3 vents at the bottom of the log torch, 3 vents at the top of the torch, 3 notches at the top of the log torch, and 3 notches at the bottom of the torch.
Figure 41:
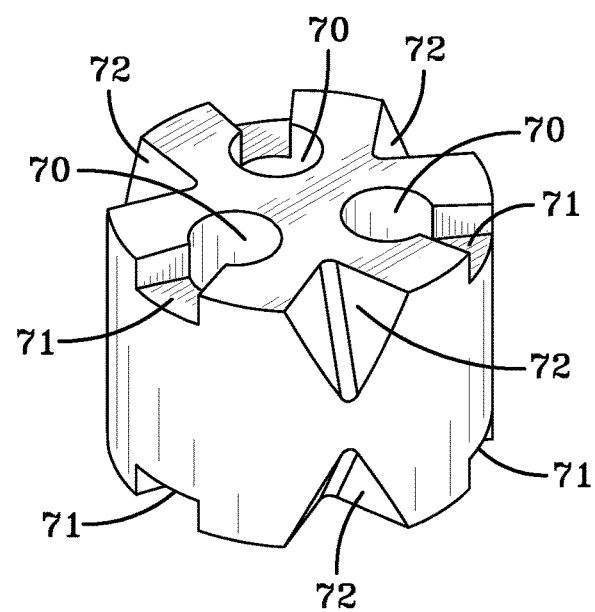
FIG. 41 is a top perspective view of the log torch illustrated in FIG. 40 having one vertical cavity which extends completely through the log torch from its top end through its bottom end, 3 vents at the bottom of the log torch, 3 vents at the top of the torch, 3 notches at the top of the log torch, and 3 notches at the bottom of the torch.
Figure 42:
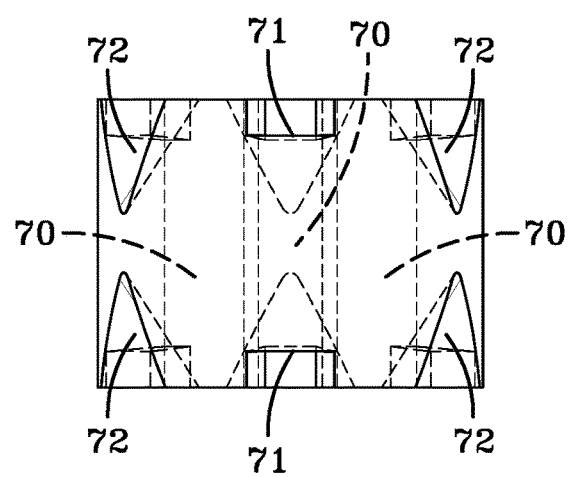
FIG. 42 is an illustrative side view of the log torch shown in FIGS. 40 and 41 showing the vertical cavity which extends completely through the log torch from its top end through its bottom end, the 3 vents at the bottom of the log torch, the 3 vents at the top of the torch, the 3 notches at the top of the log torch, and the 3 notches at the bottom of the torch.
Figure 43:
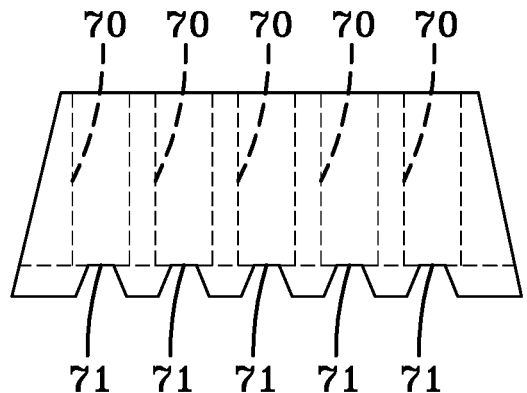
FIG. 43 is an illustrative side view of a fireplace log of this invention having 5 vertical cavities which extend completely through the log torch from its top end through its bottom end and 12 vents at the bottom of the fireplace log.
Figure 44:
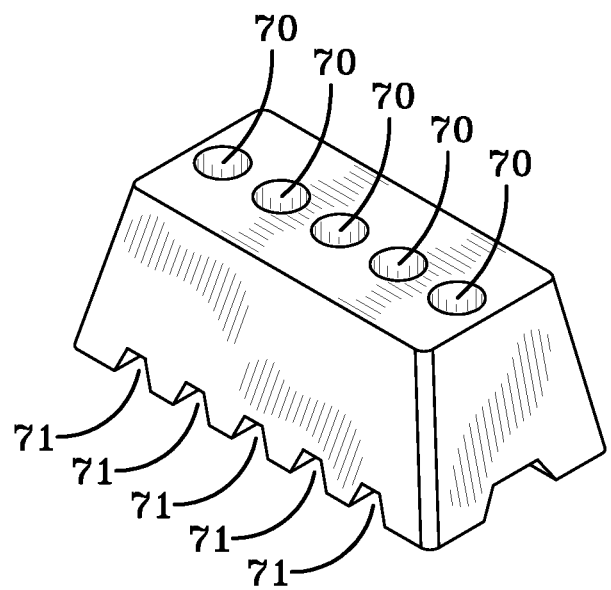
FIG. 44 is a top perspective view of the fireplace log illustrated in FIG. 43 having 5 vertical cavities which extend completely through the log torch from its top end through its bottom end and 12 vents at the bottom of the fireplace log.
Figure 45:
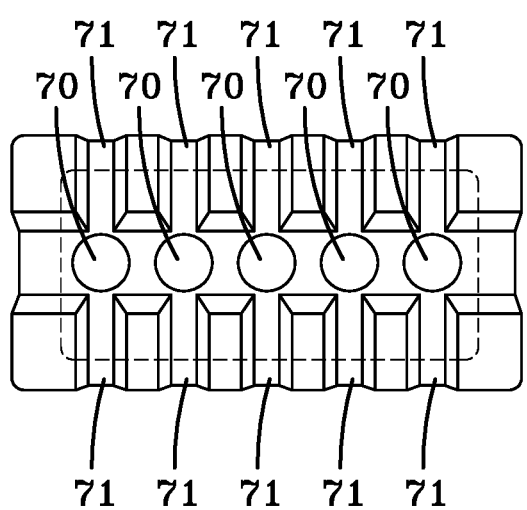
FIG. 45 is an illustrative top view of the fireplace log illustrated in FIG. 43 and FIG. 44 having 5 vertical cavities which extends completely through the log torch from its top end through its bottom end and 12 vents at the bottom of the fireplace log.

Cotton balls or pieces of cotton fiber can also be inserted into a cross-vent in the torch log to facilitate catching the torch log on fire. Such a design is illustrated in FIGS. 25, 26, and 27. In this log design 60 there are three vertical cavities 61 and a cross-vent 62 which extend through the log torch 60 from its top end 63 through its bottom end 64, wherein the cross-vent includes the cotton igniter 65 to facilitate catching the log torch on fire. The combustible log torch 60 can optionally also include one or more cuts outs or notches 51 which are situated on the top or lower outside surface 52 of the combustible log torch 60 and facilitate the outer parts of the log torch falling inwardly as it burns to help contain the fire within a more concentrated and smaller area. In any case, the use of cotton igniters is more desirable in log torches of smaller sizes that they are in standard scale log torches.

Cross-vents between the vertical cavities can optionally be included in the combustible log torch in cases where more than one vertical cavity is present. Such cross-vents help to insure that relatively uniform burning across the cross-section of the log torch occurs. FIGS. 16-19 illustrate a combustible log torch having a cross-vent which connects three vertical cavities. In this embodiment of the invention the combustible log torch 40 includes three vertical cavities 41, 42, and 43 and a cross-vent 44 which interconnects the three vertical cavities 41, 42, and 43. In the embodiment of the invention illustrated in FIGS. 16-19, the cross-vent 44 extends through the entire length of the combustible log torch 40 and extends through both the top end 44 and the bottom end 45 of the log torch 40. In this particular embodiment of the invention the log torch 40 includes both top vents 46 and bottom vents 47 which extend from each of the vertical cavities 41, 42, and 43 and through the side 48 of the log torch 40. In this embodiment of the invention the cross-vent 44 is in the shape of a cylinder which connects the vertical cavities 41, 42, and 43. However, in other embodiments of the invention the cross-vents can be of other shapes which connect two or more vertical cavities. For instance, the cross-vents can be rectangular in shape or can simply be slits which connect two or more vertical cavities. In many cases it is preferred for such cross-vents to connect all of the vertical cavities within the combustible log torch.

Figure 20:
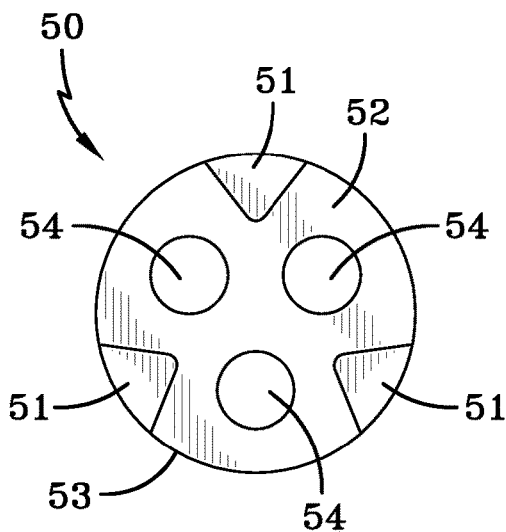
FIG. 20 is a top view of a combustible log torch having optional notches which are situated on the upper outside surface thereof.
Figure 21:
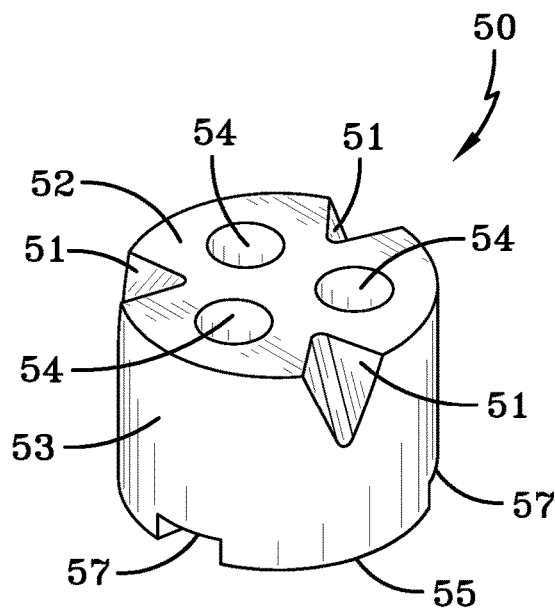
FIG. 21 is a top perspective view of a combustible log torch having optional notches which are situated on the upper outside surface thereof.
Figure 22:
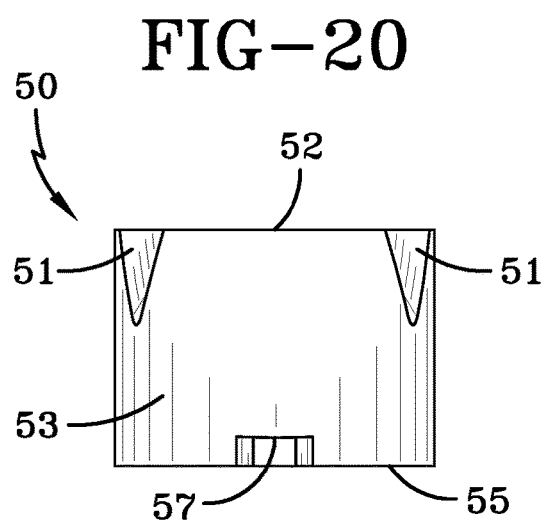
FIG. 22 is a side view of a combustible log torch having optional notches which are situated on the upper outside surface thereof.
Figure 23:
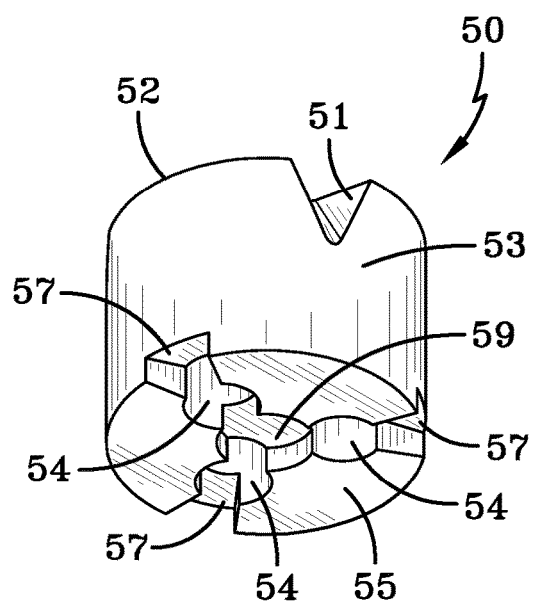
FIG. 23 is a side perspective view of a combustible log torch having optional notches which are situated on the upper outside surface thereof.
Figure 24:
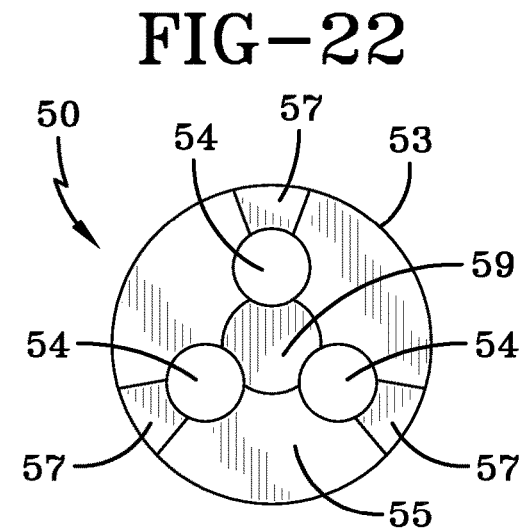
FIG. 24 is a bottom view of a combustible log torch having optional notches which are situated on the upper outside surface thereof.

In another embodiment of this invention the combustible log torch 50 can optionally also include one or more cuts outs or notches 51 as illustrated in FIGS. 20-24. These notches 51 are situated on the upper outside surface 52 of the combustible log torch 50 and facilitate the outer parts of the log torch 50 falling inwardly as it burns to help contain the fire within a more concentrated and smaller area. This desirable characteristic is attained by virtue of some of the mass from the outside surface 53 of the combustible log torch 50 being removed thereby shifting the overall mass of the log torch 50 inwardly. Such notches 51 are also useful in that they provide points at which other logs can be conveniently stacked against them which is particularly useful in cases where the combustible log torch 50 is being used as a starter log to initiate the burning of natural logs in a campfire, in a fireplace or in a fire pit. Such notches 51 can be of a triangular shape (V-shaped) as illustrated in FIGS. 20-24 or that can be of another convenient geometry, such as square cuts or rounded. In some cases, it is convenient for the number of notches 51 to be equal to the number of vertical cavities (updraft chambers) 54 included in the combustible log torch 50. As illustrated in FIG. 20 and FIG. 21, the notches 51 can be evenly distributed along the upper outside surface of the combustible log torch 50 and spaced in areas which are between vertical cavities 54. For instance, FIG. 20 and FIG. 21 show a combustible log torch 50 having 3 V-shaped notches 51 and 3 vertical cavities 54 which are distributed over the upper surface of the log torch in an alternating pattern.

The combustible log torches of this invention can vary in size. However, to attain a reasonable burn time and a fire that is typically of the size desired in most camping situations and for bonfires, the log torches of this invention will typically be of a diameter which is within the range of 1 inch to 15 inches and more typically within the range of 5 inches to 14 inches. The combustible log torches of this invention will more typically have a diameter which is within the range of 7 inches to 11 inches and will preferably have a diameter which is within the range of 8 inches to 10 inches. The combustible log torches of this invention will typically be from about 4 inches to about 12 inches high (as measured from the bottom end to the top end). They will more typically be from about 4 inches to about 10 inches high and will preferable be from about 5 inches to about 8 inches high.

The combustible log torches of this invention are made by compacting a wood particle composition which is comprised of wood particles and a food grade binder. The wood particles can be from a hardwood source, such maple, cherry, red oak, black oak, which oak, black walnut, chestnut, pecan, alder, ash, aspen, basswood, beech, cottonwood, hackberry, hickory, poplar, sycamore, yellow birch, paper white birch, or other hardwood trees. The wood particles can also be a mixture of sawdust for hardwood trees and from softwood trees. The softwood particles can come from cedar, fir, hemlock, pine, redwood, spruce, cypress, or other softwood trees. In some cases, to attain an optimal fire and long burn time it is desirable to utilize such a mixture of hardwood particles and softwood particles. For instance, the ratio of hard wood particles to soft wood particles in such mixtures can be within the range of 0.5:1 to 10:1. In such compositions the ratio of hard wood particles to soft wood particles is more typically within the range of 1:1 to 8:1. In many cases, the ratio of hard wood particles to soft wood particles will be within the range of 2:1 to 6:1. The wood particles will typically be in the form of wood sawdust, wood shavings, wood chips, and/or wood dust. Various combinations of such wood particles can be selected to attain optimal burn characteristics and burn time. In some cases, it is desirable for the wood particle composition to be comprised entirely or predominantly of wood sawdust. For instance, such mixtures of wood particles will frequently contain 60%, 70%, 80%, 90% or more wood sawdust, based upon the total weight of wood particles in the wood particle composition.

To attain optimal flame characteristics and burn time, supplemental lignin can also be included in the wood particle composition. In such wood particle compositions, the supplemental lignin will typically be present in the wood particle composition at a level of 5 weight percent to 40 weight percent, based upon the total solids weight of the wood particle composition. The lignin supplement will more typically be added to the wood particle composition at a level which is within the range 10 weight percent to 30 weight percent, based upon the total solids weight of the wood particle composition. The lignin supplement will frequently be added to the sawdust composition at a level which is within the range of 15 weight percent to 25 weight percent, based upon the total solids weight of the wood particle composition. Lignin is, of course, inherently present in wood and typically constitutes between 20% and 35% of the dry weight of wood. Accordingly, the term "lignin supplement" as used herein references to lignin which is in a relatively pure form which is a byproduct from papermaking and/or other industrial processes. The quantity of lignin added as "lignin supplement" is in addition to the quantity found in the wood particles in the wood particle composition. Lignin is of the approximate empirical formula $C_{31}H_{34}O_{11}$ and has been assigned CAS Number 9005-53-2.

In another embodiment of this invention the wood particle composition can also include *Hibiscus cannabinus*, which is commonly known as kenaf. Kenaf is a annual or biennial herbaceous plant that grows to heights of 12 to 18 feet in as little as 4 to 5 months. Kenaf can produce 5-10 tons of dry fiber and core per acre and typically does not require treatment with herbicides or pesticides. The kenaf plant is believed to have originated in Africa or Asia and has been cultivated for its fiber in India, Bangladesh, Thailand, and Egypt for thousands of years. Kenaf fiber, which is frequently referred to simply as "knaft," has traditionally been used in manufacturing rope, twine, clothing, rugs, and paper. Today the kenaf plant is also being commercially cultivated in the Untied States.

The kenaf plant is comprised of two distinct types of different materials. These materials include an outer fiber and a core. The outer fiber is frequently referred to as simply the fiber and is sometimes called the bast or the bast fiber. The bast accounts for about one-third of the plant by weight. The core is a low density woody type material while the bast is a much lower density fluffy type fiber of high tensile strength. As harvested, the bast fibers tenaciously adhere to the core. In a typical harvested kenaf crop, the core is slightly tapered from bottom to top and has a small diameter at the top in the range of 0.25 inch to 0.5 inch. The core and fibers have distinctly different uses and must be separated in conventional application before they are suitable for these different uses. The economics of using kenaf in high volume applications is attractive because the cost of the cultivated crop compares very favorably to the cost of wood.

Either kenaf fibers, kenaf core material, or both can be optionally be included in the wood particle compositions employed in the combustible log torches of this invention. Using both kenaf fibers and kenaf core material offers a significant advantage in that it eliminates the need to separate the kenaf core material from the kenaf fibers. In this embodiment of the invention the level of kenaf (fibers and/or core material) included in the wood particle composition will depend upon the type of wood particles utilized as well as the specific nature of the food grade binder and will be adjusted to attain desired flame characteristics and burn time (rate of burn). In such wood particle compositions, the kenaf will typically be present in the wood particle composition at a level of 5 weight percent to 40 weight percent, based upon the total solids weight of the wood particle composition. The kenaf will more typically be added to the wood particle composition at a level which is within the range 10 weight percent to 30 weight percent, based upon the total solids weight of the wood particle composition. The kenaf will frequently be added to the wood particle composition at a level which is within the range of 15 weight percent to 25 weight percent, based upon the total solids weight of the wood particle composition.

In another embodiment of this invention the wood particle composition can also include hemp from *Cannabis sativa*, *Cannabis indica*, and/or *Cannabis ruderalis* plants. It may be desirable to utilized hemp fibers from plants which have been bred to produce minimal levels of tetrahydrocannabinol (THC) to comply with applicable laws. In any case, the level of hemp fiber included in the wood particle composition will depend upon the type of wood particles utilized as well as the specific nature of the food grade binder and will be adjusted to attain desired flame characteristics and burn time (rate of burn). In such wood particle compositions, the hemp will typically be present in the wood particle composition at a level of 5 weight percent to 40 weight percent, based upon the total solids weight of the wood particle composition. The hemp will more typically be added to the wood particle composition at a level which is within the range 10 weight percent to 30 weight percent, based upon the total solids weight of the wood particle composition. The hemp will frequently be added to the wood particle composition at a level which is within the range of 15 weight percent to 25 weight percent, based upon the total solids weight of the wood particle composition.

In another embodiment of this invention the wood particle composition can also include a triglyceride oil to improve the manner in which the combustible log torch burns. Such triglyceride oils typically vegetable oils which are esters that are from glycerol and three fatty acids. Some representative examples of triglyceride oils that can be used include almond oil, canola oil, coconut oil, corn oil, cotton seed oil, flax seed oil, grape seed oil, olive oil, palm oil, peanut oil, safflower oil, sesame oil, soybean oil, sunflower oil, walnut oil, and mixtures thereof. In many cases it is preferred to employ soybean oil or corn oil as the triglyceride oil. In any case, the level of triglyceride oils included in the wood particle composition will depend upon the type of wood particles utilized as well as the specific nature of the food grade binder and will be adjusted to attain desired flame characteristics and burn time (rate of burn). In such wood particle compositions, the triglyceride oil will typically be present in the wood particle composition at a level of 1 weight percent to 35 weight percent, based upon the total solids weight of the wood particle composition. The triglyceride oil will more typically be added to the wood particle composition at a level which is within the range 5 weight percent to 20 weight percent, based upon the total solids weight of the wood particle composition. The triglyceride oil will frequently be added to the wood particle composition at a level which is within the range of 6 weight percent to 15 weight percent or at a level which is within the range of 8 weight percent to 12 weight percent, based upon the total solids weight of the wood particle composition. The triglyceride oil can be mixing into the wood particle composition prior to compaction or it can be applied to the surface of a combustible log torch and allowed to be absorbed into the matrix of the wood particle composition of the log torch. It is typically preferred to apply the triglyceride oil to the surface of the log torch and allow it to be absorbed therein because this procedure helps to prevent the triglyceride oil from becoming rancid and accordingly allows for the log torch to be stored over a longer period before being burnt. A wide variety of methods can be used for applying the triglyceride oil to the surface of the log torch. For instance, the triglyceride oil can be sprayed onto the surface of the log torch or the log torch can be dipped into the triglyceride oil. The triglyceride oil can also be applied to the surface of the log torch with brushes or rollers. In any case, to attain better burn characteristics it is preferred to apply the triglyceride oil to the top (upper part) of the log torch.

The food grade binder used can be any material which will adequately bind the sawdust in the form of the combustible log torch of this invention and which does not emit toxic materials, compounds which impart foul flavors to food, and/or compounds which have undesirable odors. Such food grade binders are typically aqueous solutions of various food products. Some representative examples of food grade binders that can be used include, but are not limited to, sugar solutions, molasses, honey, maple syrup, corn syrup, and the like. To attain optimal flame characteristics and burn time flour or another starch can also be included in the food grade binder formulation. In cases where flour is utilized it will typically be employed at a maximum level of 50 weight percent of the food grade binder formulation, based upon total dry weight of the food grade binder composition. In most cases, flour will be utilized at a maximum level of 40 weight percent, 30 weight percent, 20 weight percent, or 10 weight percent. In another embodiment of the invention polyvinyl alcohol (PVOH) can also be included as the binder or in conjunction with other food grade binders.

The sugar employed in the food grade binder can be a monosaccharide, disaccharide, or a oligosaccharide. For instance, the monosaccharide can be selected from the group consisting of glucose (dextrose), fructose, and galactose. The disaccharide can be selected from the group consisting of sucrose, maltose, and lactose. In many cases it is preferable to utilize sucrose which is extracted from sugarcane (*Saccharum alopecuroidum, Saccharum angustifolium, Saccharum arundinaceum, Saccharum asperum, Saccharum bengalense, Saccharum brevibarbe, Saccharum coarctatum, Saccharum fallax, Saccharum formosanum, Saccharum giganteum, Saccharum griffithii, Saccharum hildebrandtii, Saccharum kanashiroi, Saccharum longesetosum, Saccharum maximum, Saccharum narenga, Saccharum officinarum, Saccharum perrieri, Saccharum procerum, Saccharum ravennae, Saccharum robustum, Saccharum rufipilum, Saccharan sikkimense, Saccharum spontaneum, Saccharum stewarti, Saccharum strictum, Saccahrum velutinum, Saccahrum viguieri, Saccharum villosum, Saccharum wardii, Saccharum williamsii*, or another variety of sugarcane). The sucrose can also be extracted from sugar beets (*Beta vulgaris*).

In most cases it is desirable to utilize the food grade binder as a highly concentrated or saturated aqueous solution. The food grade binder is typically present in the aqueous solution at a concentration of at least 300 g/l and can be present at concentrations of at least 400 g/l, at least 450 g/l, at least 500 g/l, at least 520 g/l, or even at least 535 g/l. Such aqueous solutions will normally include the food grade binder at a concentration which is within the range of 300 g/l to 550 g/l. For instance, the food grade binder can be present in the aqueous solution at a concentration which is within the range of 400 g/l. to 550 g/l, at a concentration which is within the range of 450 g/l to 540 g/l, at a concentration which is within the range of 500 g/l to 540 g/l, at a concentration which is within the range of 500 g/l to 535 g/l, at a concentration which is within the range of 520 g/l to 550 g/l, at a concentration which is within the range of 520 g/l to 540 g/l, at a concentration which is within the range of 520 g/l to 535 g/l, at a concentration which is within the range of 530 g/l to 550 g/l, at a concentration which is within the range of 530 g/l to 540 g/l, or at a concentration which is within the range of 530 g/l to 535 g/l.

The weight ratio of the wood particles to the food grade binder (solution) in the sawdust composition will typically be within the range of 4:1 to 0.2:1 and will more typically be within the range of 3:1 to 0.5:1. The weight ratio of wood particles to the food grade binder (solution) in the wood particle composition will preferably be within the range of 2:1 to 0.8:1, will more preferably be within the range of 1.6:1 to 1:1, and will most preferably be within the range of 1.4:1 to 1.1.

The pressure utilized in compacting the wood particle composition into the desired shape of the log torch will normally be within the range of about 5 psi (0.034 megapascals) to about 2000 psi (13.89 megapascals), and will typically be within the range of about 10 psi (0.069 megapascals) to about 1500 psi (10.34 megapascals). In many cases the pressure utilized will be within the range of about 50 psi (0.34 magapascals) to about 800 psi (5.52 magapascals). The pressure used will preferably be within the range of about 100 psi (0.69 magapascals) to about 400 psi (2.76 magapascals), and will most preferably be within the range of about 150 psi (1.03 magapascals) to about 250 psi (1.72 magapascals). After the combustible torch log is manufactured it is preferably packaged in a water vapor barrier film to maintain the needed moisture level within the torch log so that it will burn with the desired flame characteristics and at the desired rate. The film used can be selected from a wide variety of plastic materials with low density polyethylene being preferred.

In a highly preferred embodiment of this invention a standard scale log torch can be made. Such a standard scale log torch typically has an outside diameter which is within the range of 7 inches to 9 inches and is about 6 inches to 7 inches high. Such a standard scale log torch will also typically include vertical cavities which are about 1.5 inch to 2.5 inches in diameter. For instance, such a log torch can have an outside diameter of 8 inches, a height of 6.5 inches, and vertical cavities which are 2 inches in diameter. Such a log torch will have a ratio of vertical cavity diameter to outside diameter to height of about 1:4:3.25.

In another highly preferred embodiment of this invention mini-log torches can be made. Such a mini-log torch typically has an outside diameter which is within the range of 1 inch to 5 inches and is about 1 inch to 5 inches high. Such a standard scale log torch will also typically include vertical cavities which are about 1 inch to 1.5 inches in diameter. For instance, such a log torch can have an outside diameter of 4 inches, a height of 4.75 inches, and vertical cavities which are 1.125 inches in diameter. Such a log torch will have a ratio of vertical cavity diameter to outside diameter to height of about 1:3.55:4.23.

The food grade binder used in the practice of this invention will normally contain a minimum of 100 grams of sugar per liter of water. It will more typically contain 1000 grams to 2500 grams of sugar per liter of water. The water is preferably heated to a temperature which is within the range of about 90° F. to 135° F. and is more preferably heated to a temperature which is within the range of 110° F. to 125° F. to improve solubility. In most cases the water will be heated to a temperature of about 120° F. and about 2500 grams of sugar will be added to it in making the food grade binder. However, in some manufacturing environments it is desirable to simply use molten sugar at a temperature of about 300° F. to 350° F. as the binder.

In some embodiments of this invention the combustible log torch is comprised of wood particles, such as saw dust, sugar, and a triglyceride oil, such as a vegetable oil. Such compositions will typically contain from 12.5 grams to 1600 grams of oil and 100 grams to 7,500 grams of sugar per 1200 grams of wood particles. Such compositions will more typically contain from 100 grams to 1000 grams of oil and 500 grams to 4,000 grams of sugar per 1200 grams of wood particles. Such compositions will more preferably contain from 125 grams to 400 grams of oil and 1000 grams to 2,000 grams of sugar per 1200 grams of wood particles. For instance, such compositions can contain about 150 grams of oil and 1475 grams of sugar per 1200 grams of wood particles.

After the combustible log torch is manufactured by compacting a mixture of wood particles and a food grade binder in accordance with this invention additional oil can be added to the combustible log torch. This can be accomplished by simply applying the oil to the surface of the log torch and will typically further enhance the burn characteristic of the log torch. The oil can be applied to the manufactured log torch by a wide variety of techniques, including but not limited to, spraying, dipping, and brushing. The oil will typically be a triglyceride oil, such as a vegetable oil. The oil will normally be applied in an amount which is within the range of 2 grams to 1600 grams per 1200 grams of wood particles. The oil will typically be applied in an amount which is within the range of 4 grams to 1200 grams per 1200 grams of wood particles. The oil will more typically be applied in an amount which is within the range of 10 grams to 800 grams per 1200 grams of wood particles. The oil will preferably be applied in an amount which is within the range of 20 grams to 400 grams per 1200 grams of wood particles. The oil will more preferably be applied in an amount which is within the range of 40 grams to 200 grams per 1200 grams of wood particles. The oil will most preferably be applied in an amount which is within the range of 50 grams to 100 grams per 1200 grams of wood particles. For instance, the oil can be applied at a level of about 75 grams per 1200 grams of wood particles.

Figure 46:
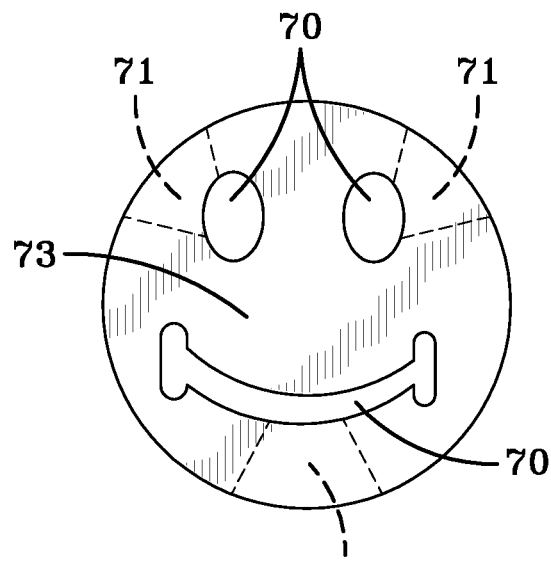
FIG. 46 is a log torch of this invention having a "smiley face" wherein the "smiley face" is made by 3 vertical cavities which extends completely through the log torch from its top end through its bottom end. This design has a flat top and also includes 3 vents which extend out of each of the vertical cavities.
Figure 47:
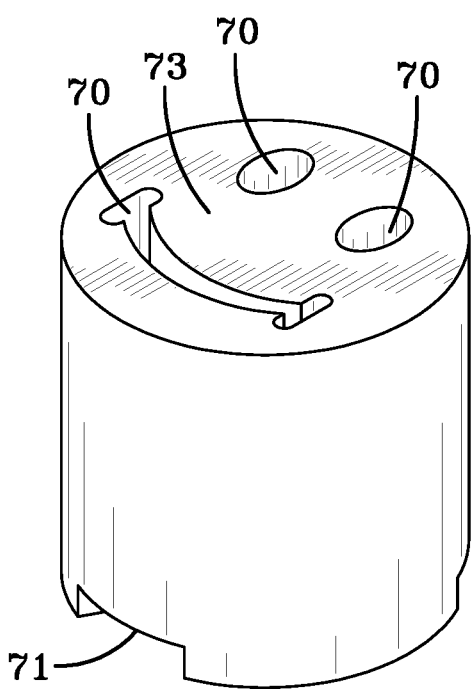
FIG. 47 is a top perspective view of the torch log illustrated in FIG. 46 having 3 vertical cavities which extends completely through the log torch from its top end through its bottom end forming the "smiley face". This design has a flat top and also includes 3 vents which extend out of each of the vertical cavities.
Figure 48:
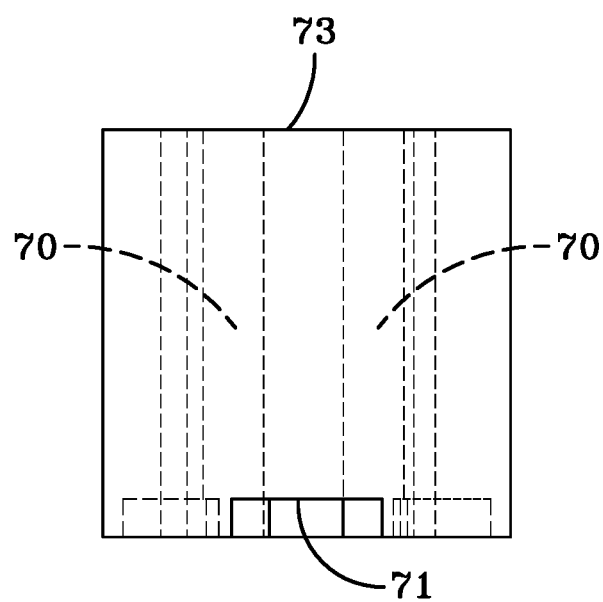
FIG. 48 is an illustrative side view of the torch log illustrated in FIGS. 46 and 47 which illustrates the vertical cavities which extend completely through the log torch from its top end through its bottom end forming the "smiley face".
Figure 49:
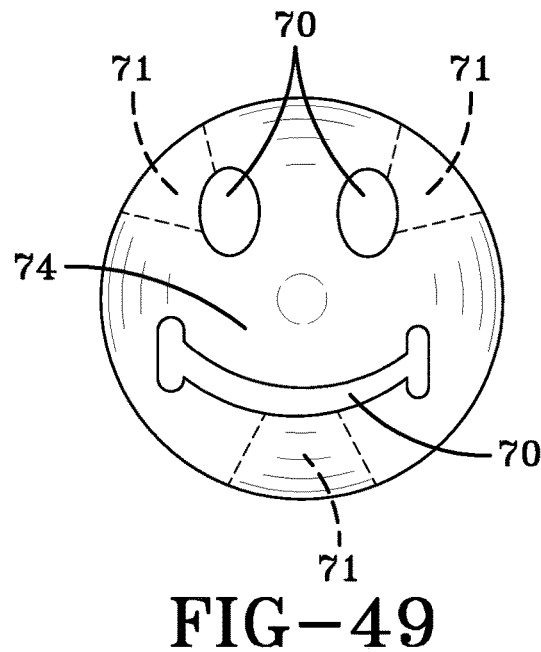
FIG. 49 is a log torch of this invention having a "smiley face" wherein the "smiley face" is made by 3 vertical cavities which extend completely through the log torch from its top end through its bottom end. This design has a rounded top and also includes 3 vents which extend out of each of the vertical cavities.
Figure 50:
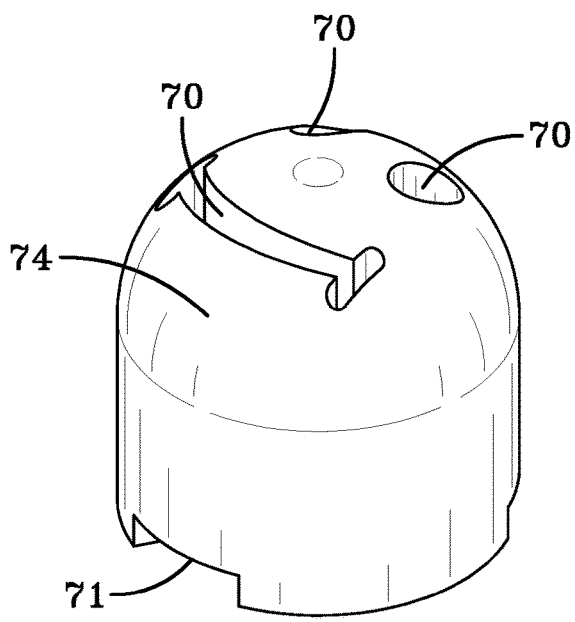
FIG. 50 is a top perspective view of the torch log illustrated in FIG. 49 having 3 vertical cavities which extend completely through the log torch from its top end through its bottom end forming the "smiley face". This design has a rounded top and also includes 3 vents which extend out of each of the vertical cavities.
Figure 51:
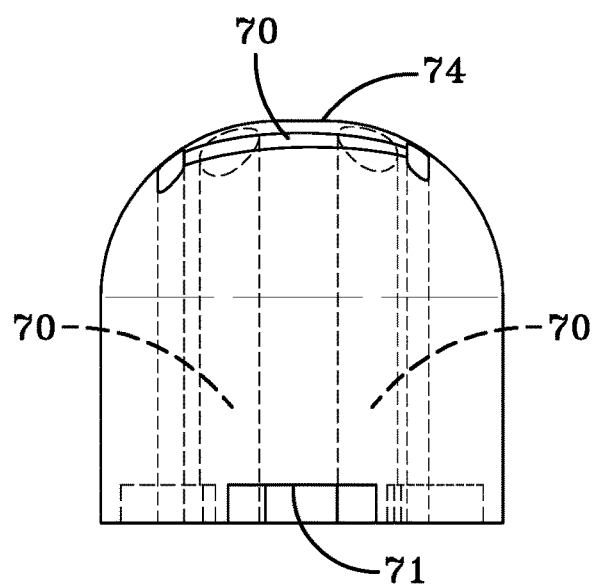
FIG. 51 is an illustrative side view of the torch log illustrated in FIGS. 49 and 50 which illustrates the vertical cavities which extend completely through the log torch from its top end through its bottom end forming the "smiley face".
Figure 52:
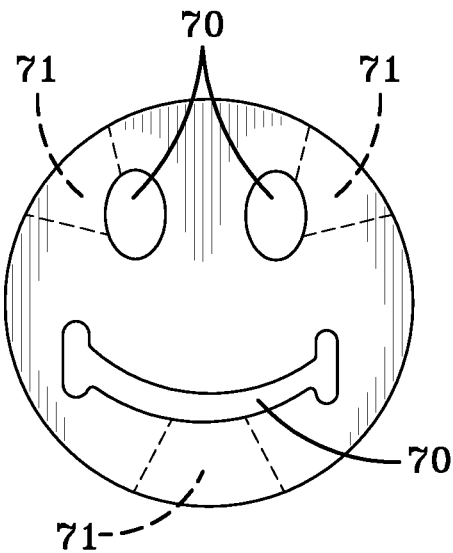
FIG. 52 is a log torch of this invention having a "smiley face" wherein the "smiley face" is made by 3 vertical cavities which extend completely through the log torch from its top end through its bottom end. This design has a sloped top and also includes 3 vents which extend out of each of the vertical cavities.
Figure 53:
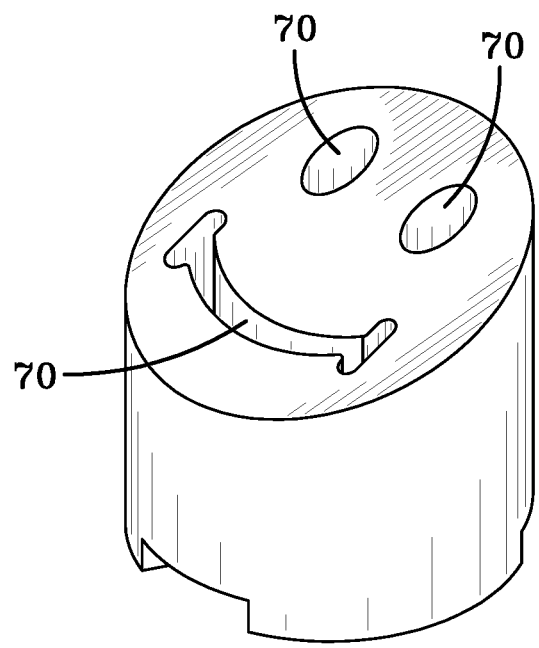
FIG. 53 is a top perspective view of the torch log illustrated in FIG. 52 having 3 vertical cavities which extend completely through the log torch from its top end through its bottom end forming the "smiley face". This design has a sloped top and also includes 3 vents which extend out of each of the vertical cavities.
Figure 54:
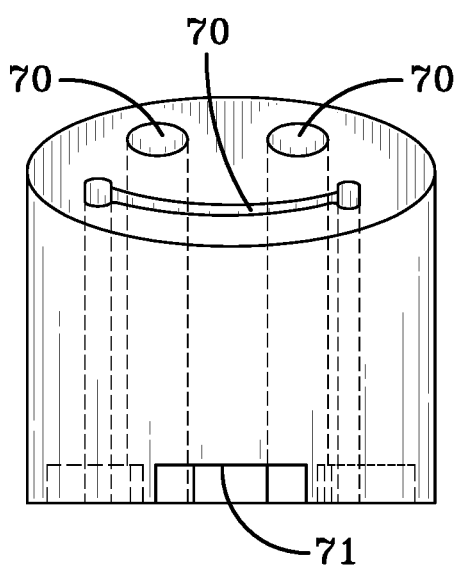
FIG. 54 is an illustrative side view of the torch log illustrated in FIGS. 52 and 53 which illustrates the vertical cavities which extend completely through the log torch from its top end through its bottom end forming the "smiley face".
Figure 55:
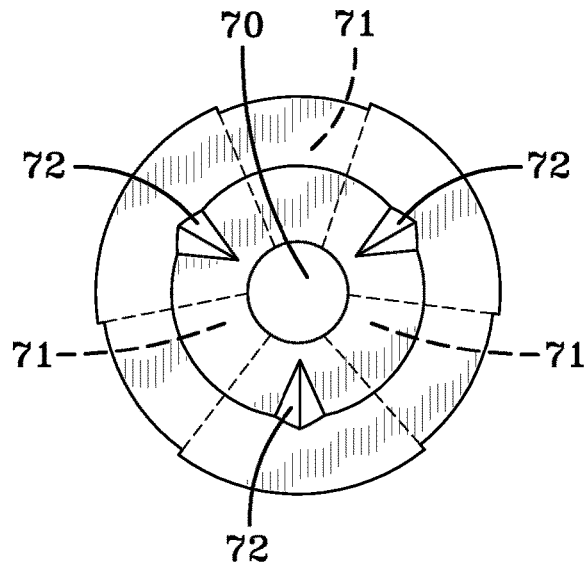
FIG. 55 is an illustrative top view log torch of this invention having a volcano design which includes a single vertical cavity which extends completely through the log torch from its top end through its bottom end, 3 vents at the bottom of the torch, and 3 notches at the top of the torch.
Figure 56:
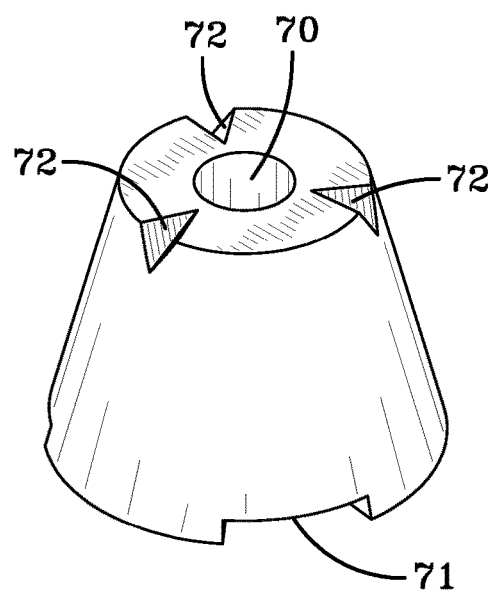
FIG. 56 is a top perspective view of the torch log illustrated in FIG. 55 which includes a single vertical cavity which extends completely through the log torch from its top end through its bottom end, 3 vents at the bottom of the torch, and 3 notches at the top of the torch.
Figure 57:
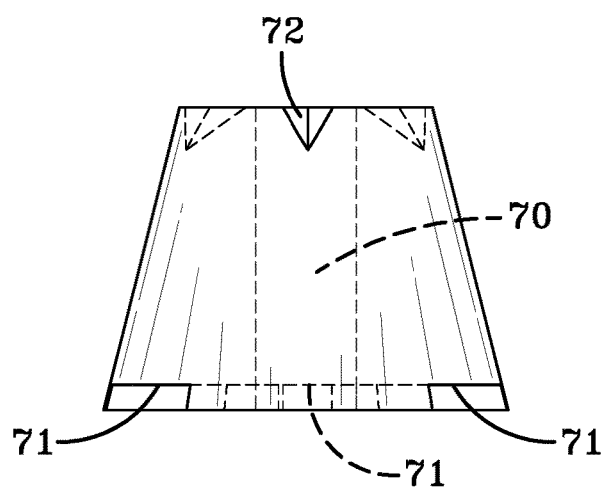
FIG. 57 is an illustrative side view of the torch log illustrated in FIGS. 55 and 56 which illustrates the vertical cavities which extend completely through the log torch from its top end through its bottom end.
Figure 58:
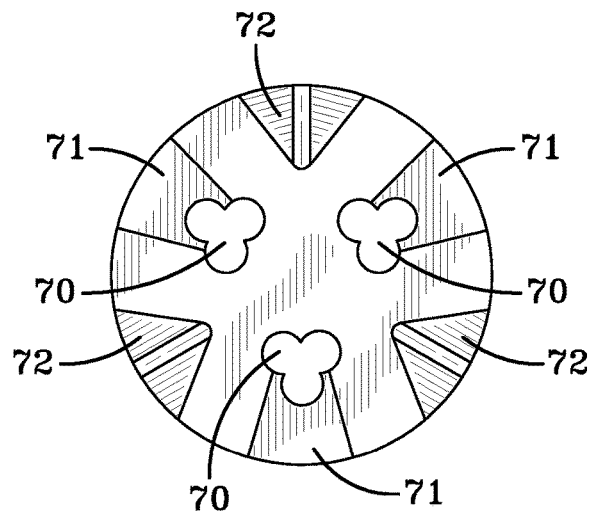
FIG. 58 is a top view log torch of this invention having a clover design which includes 3 clover shaped vertical cavities which extend completely through the log torch from its top end through its bottom end, 3 vents at the bottom of the torch, 3 vents at the top of the torch, 3 notches at the top of the torch, and 3 notches at the bottom of the torch.
Figure 59:
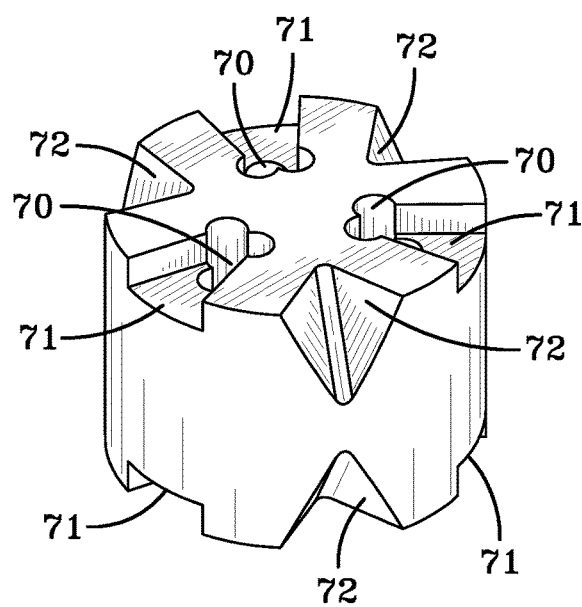
FIG. 59 is a top perspective view of the torch log illustrated in FIG. 58 which includes 3 clover shaped vertical cavities which extend completely through the log torch from its top end through its bottom end, 3 vents at the bottom of the torch, 3 vents at the top of the torch, 3 notches at the top of the torch, and 3 notches at the bottom of the torch.
Figure 60:
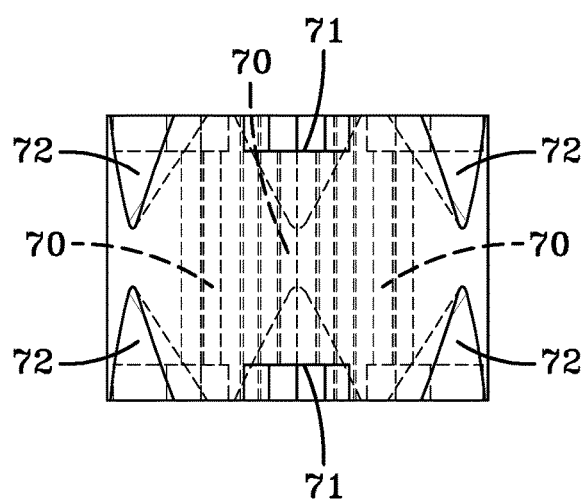
FIG. 60 is an illustrative side view of the torch log illustrated in FIGS. 58 and 59 which illustrates the vertical cavities which extend completely through the log torch from its top end through its bottom end.
Figure 61:
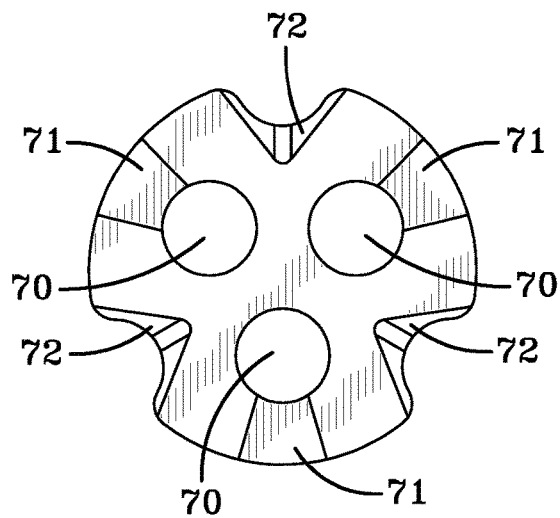
FIG. 61 is a top view of a log torch of this invention having notches that run from the top to the bottom of the log torch. In this design the log torch includes 3 round vertical cavities which extend completely through the log torch from its top end through its bottom end, 3 vents at the bottom of the torch, 3 vents at the top of the torch, and 3 notches the extend from the top to the bottom of the torch.
Figure 62:
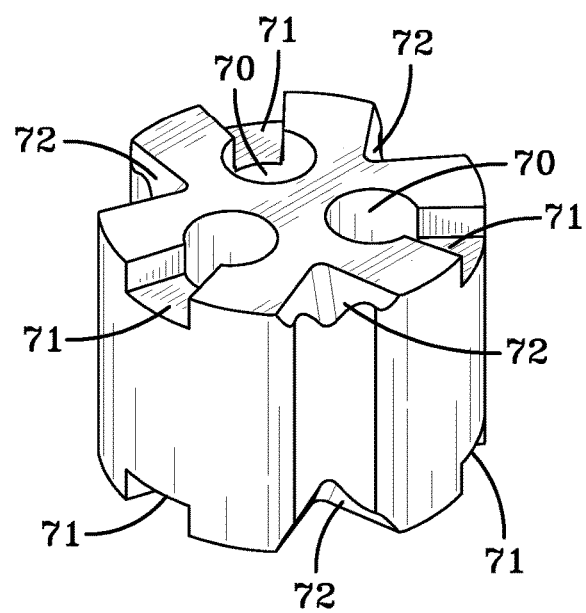
FIG. 62 is a top perspective view of the torch log illustrated in FIG. 61 which includes 3 round vertical cavities which extend completely through the log torch from its top end through its bottom end, 3 vents at the bottom of the torch, 3 vents at the top of the torch, and 3 notches the extend from the top to the bottom of the torch.
Figure 63:
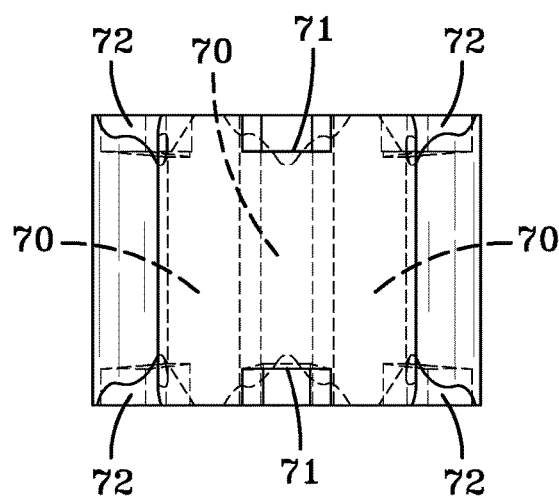
FIG. 63 is an illustrative side view of the torch log illustrated in FIGS. 61 and 62 which illustrates the vertical cavities which extend completely through the log torch from its top end through its bottom end.

FIGS. 25 through 63 illustrate log designs that can be made utilizing the method of this invention. These combustible log designs include various combinations of vertical cavities 70, vents 71, and notches 72. The "smiley face" design shown in FIGS. 46-48 has a flat top surface 73, the "smiley face" design shown in FIGS. 49-51 has a rounded top surface 74, and the "smiley face" design shown in FIGS. 52-54 has a slanted top surface 75.

While certain representative embodiments and details have been shown for the purpose of illustrating the subject invention, it will be apparent to those skilled in this art that various changes and modifications can be made therein without departing from the scope of the subject invention. The illustrations and corresponding descriptions are not intended to restrict or limit the scope of the appended claims in any way.

What is claimed is:

1. A method for manufacturing a combustible log torch which comprises compacting a wood particle composition which is comprised of a mixture of wood particles and a food grade binder under a pressure of at least about 5 psi in a mold to produce the combustible log torch having at least three vertical cavities which extend vertically through the entire length of the combustible log torch, wherein the food grade binder is an aqueous solution of sugar in water which contains at least 1000 grams of sugar per liter of water, and wherein the aqueous solution of sugar in water is at a temperature which is within the range of 90° F. to 135° F., wherein the torch produced by the mold has vents which extend through the circumferential peripheral side of the torch longitudinally from each of the vertical cavities wherein the three vertical cavities are essentially circular and have a diameter which is from about 20% to about 30% of the diameter of the combustible log torch, wherein the vertical cavities are arranged on the top end and the bottom end of the torch log in a circular pattern with the holes being centered about 40% to about 65% of the distance from the center of the combustible log torch to its circumferential peripheral side.

2. The method of claim 1 wherein the sugar is selected from the group consisting of monosaccharides, disaccharides, and oligosaccharides.

3. The method of claim 1 wherein oil is added to the combustible log torch after it is made by compaction of the wood particles and a food grade binder.

4. The method of am claim 1 wherein the weight ratio of the wood particles to the food grade binder in the wood particles composition is within the range of 4:1 to 0.2:1.

5. The method of claim 1 wherein the wood particle composition is further comprised of an oil.

6. The method of claim 1 further comprises a subsequent step of applying a triglyceride oil to the surface of the combustible log torch and allowing the triglyceride oil to be absorbed into the combustible log torch.

7. The method of claim 1 wherein the triglyceride oil is applied at a level which is within the range of 5 weight percent to 20 weight percent, based upon the total solids weight of the wood particle composition.

8. The method of claim 1 which further comprises a subsequent step of pushing an igniter into at least one vertical cavity of the combustible log torch.

9. The method of claim 8 wherein the igniter is a piece of cotton.

10. The method of claim 1 wherein the food grade binder is a saturated aqueous solution of sugar in water.

11. The method of claim 1 further comprises a subsequent step of packaging the combustible log torch in a plastic film having a high degree of resistance to permeation by water vapor.

12. The method of claim 1 wherein the combustible log torch produced by the mold is essentially cylindrical in shape, and wherein the combustible log torch produced by the mold has an outside diameter which is within the range of 7 inches to 9 inches.

13. A method for manufacturing a combustible log torch which comprises compacting a wood particle composition which is comprised of a mixture of wood particles and a food grade binder under a pressure of at least about 5 psi in a mold to produce the combustible log torch having at least 3 vertical cavities which extend vertically through the entire length of the combustible log torch, wherein the three vertical cavities are essentially circular and have a diameter which is from about 20% to about 30% of the diameter of the combustible log torch, wherein the vertical cavities are arranged on the top end and the bottom end of the torch log in a circular pattern with the holes being centered about 40% to about 65% of the distance from the center of the combustible log torch to its circumferential peripheral side.

14. The method of claim 13 further comprises a subsequent step of pushing an igniter into at least one vertical cavity of the combustible log torch.

* * * * *